(12) United States Patent
Yui et al.

(10) Patent No.: US 9,541,787 B2
(45) Date of Patent: Jan. 10, 2017

(54) LIGHT CONTROL FILM INCLUDING LIGHT CONTROL LAYER WITH REFLECTION SURFACE AND DISPLAY DEVICE INCLUDING SAME

(71) Applicant: Sharp Kabushiki Kaisha, Osaka-shi, Osaka (JP)

(72) Inventors: Hideomi Yui, Osaka (JP); Tsuyoshi Maeda, Osaka (JP); Shohei Katsuta, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/648,315

(22) PCT Filed: Nov. 27, 2013

(86) PCT No.: PCT/JP2013/081915
§ 371 (c)(1),
(2) Date: May 29, 2015

(87) PCT Pub. No.: WO2014/084261
PCT Pub. Date: Jun. 5, 2014

(65) Prior Publication Data
US 2015/0301398 A1    Oct. 22, 2015

(30) Foreign Application Priority Data

Nov. 30, 2012  (JP) ................................. 2012-262839

(51) Int. Cl.
*G02F 1/1335*   (2006.01)
*G02B 5/02*   (2006.01)
(Continued)

(52) U.S. Cl.
CPC ........... *G02F 1/133504* (2013.01); *B32B 3/26* (2013.01); *B32B 7/02* (2013.01); *G02B 5/0231* (2013.01);
(Continued)

(58) Field of Classification Search
CPC ................... G02F 1/133504; G02F 1/133512; G02F 1/133524; G02B 5/0231; G02B 5/0257; G02B 6/0053
See application file for complete search history.

(56) References Cited

FOREIGN PATENT DOCUMENTS

| JP | 7-146404 A | 6/1995 |
|---|---|---|
| JP | 2000-352608 A | 12/2000 |

(Continued)

OTHER PUBLICATIONS

English translation of Official Communication issued in corresponding International Application PCT/JP2013/081915, mailed on Mar. 11, 2014.

*Primary Examiner* — Joseph L Williams
(74) *Attorney, Agent, or Firm* — Keating & Bennett, LLP

(57) ABSTRACT

The light control film includes a base material with transparency and a light control layer that is provided on a side of a surface which faces a display surface of a display panel in the base material, has a light shielding portion which is formed on one surface of the base material, and controls an emission direction of light by diffusing light which is emitted from the display surface, in which the light control layer includes a light emission end surface that contacts with the base material, a light incident end surface that faces the light emission end surface and has a larger area than an area of the light emission end surface, and a reflection surface that contacts with the light emission end surface and the light incident end surface and reflects light which is incident from the light incident end surface, a height from the light incident end surface to the light emission end surface is larger than a layer thickness of the light shielding portion, and the reflection surface reflects light to allocate light at a polar angle with a relatively high light flux amount among directions along prescribed azimuth angles in the display (Continued)

surface to light at a polar angle with relatively low luminance among directions along prescribed azimuth angles.

17 Claims, 14 Drawing Sheets

(51) Int. Cl.
*B32B 7/02* (2006.01)
*F21V 8/00* (2006.01)
*B32B 3/26* (2006.01)
(52) U.S. Cl.
CPC ........... *G02B 5/0257* (2013.01); *G02B 6/0053* (2013.01); *G02F 1/133512* (2013.01); *G02F 1/133524* (2013.01); *B32B 2307/416* (2013.01); *B32B 2457/20* (2013.01); *B32B 2457/202* (2013.01); *B32B 2457/206* (2013.01)

(56) References Cited

FOREIGN PATENT DOCUMENTS

| | | | |
|---|---|---|---|
| JP | 2007-514202 | A | 5/2007 |
| JP | 2007-148185 | A | 6/2007 |
| JP | 2012-155343 | A | 8/2012 |
| WO | 2009/066474 | A1 | 5/2009 |
| WO | 2012/053501 | A1 | 4/2012 |
| WO | 2012/081410 | A1 | 6/2012 |

LIGHT CONTROL FILM INCLUDING LIGHT CONTROL LAYER WITH REFLECTION SURFACE AND DISPLAY DEVICE INCLUDING SAME

TECHNICAL FIELD

The present invention relates to a light control film and a display device.

This application claims priority from Japanese Patent Application No. 2012-262839 filed on Nov. 30, 2012, the disclosure of which is incorporated herein by reference.

BACKGROUND ART

Liquid crystal display devices have been widely used as displays of portable electronic apparatuses such as cellular phones, televisions, personal computers, and the like. In general, the liquid crystal display device has high visibility from the front but a narrow viewing angle. Thus, various ideas are suggested for widening the viewing angle. As one of the ideas, a configuration has been suggested which includes a member for controlling a diffusion angle of light emitted from a display body such as a liquid crystal panel (hereinafter, the member is referred to as a light diffusion member) on a visually recognized side of the display body.

For example, PTL 1 mentioned below discloses a light diffusion sheet in which a groove with a V-shaped cross section is provided in the light diffusion layer and a light absorption layer is provided in a portion of the groove. In the light diffusion sheet, a transparent sheet formed of polyethylene terephthalate (PET) or the like is arranged on a light incident side and a light emission side of the light diffusion layer. A portion of light incident on the light diffusion layer at a right angle is totally reflected by a wall surface of the groove and thereafter emitted. Accordingly, the light emitted from the light diffusion sheet is diffused.

CITATION LIST

Patent Literature

PTL 1: Japanese Unexamined Patent Application Publication No. 2000-352608

SUMMARY OF INVENTION

Technical Problem

However, in a case where the light diffusion sheet is arranged on the light emission side of the display device, the light incident on the light diffusion layer at a relatively high incident angle is reflected by the wall surface of the groove depending on the polarization state of the light emitted from the display device. This leads to a problem that the contrast lowers and the display quality lowers.

The present invention has been made to solve the above problem, and an object thereof is to provide a light control film and a display device that improve the contrast and thereby provide high display quality.

Solution to Problem

To achieve the above object, measures described below are employed in the present invention.

That is, a light control film according to one aspect of the present invention includes: a base material with transparency; and a light control layer that is provided on a side of a surface which faces a display surface of a display panel in the base material, has a light shielding portion which is formed on one surface of the base material, and controls an emission direction of light by diffusing light which is emitted from the display surface, in which the light control layer includes a light emission end surface that contacts with the base material, a light incident end surface that faces the light emission end surface and has a larger area than an area of the light emission end surface, and a reflection surface that contacts with the light emission end surface and the light incident end surface and reflects light which is incident from the light incident end surface, a height from the light incident end surface to the light emission end surface is larger than a layer thickness of the light shielding portion, and the reflection surface reflects light to allocate light at a polar angle with a relatively high light flux amount among directions along prescribed azimuth angles in the display surface to light at a polar angle with relatively low luminance among directions along prescribed azimuth angles.

In the light control film, given that the polar angle with a largest light flux amount among the directions along the prescribed azimuth angles is set as $\theta_1$, the polar angle at which normalized luminance of the display panel is 10% or lower in a range where the polar angle is −60° to 60° among the directions along the prescribed azimuth angles is set as $\theta_2$, a refractive index of a film main body that includes the base material and the light control layer is set as n, and an angle formed between the light incident end surface and the reflection surface is set as $\theta_3$, the light control layer may be configured to satisfy equation (1).

[Expression 1]

$$-\sin\theta_2 = n \times \sin\left\{\arcsin\left(\frac{\sin\theta_1}{n}\right) + 2(90° - \theta_3)\right\} \quad (1)$$

A display device according to one aspect of the present invention includes: a display panel; a base material with transparency; and a light control layer that is provided on a side of a surface which faces a display surface of the display panel in the base material, has a light shielding portion which is formed on one surface of the base material, and controls an emission direction of light by diffusing light which is emitted from the display surface, in which the light control layer includes a light emission end surface that contacts with the base material, a light incident end surface that faces the light emission end surface and has a larger area than an area of the light emission end surface, and a reflection surface that contacts with the light emission end surface and the light incident end surface and reflects light which is incident from the light incident end surface, a height from the light incident end surface to the light emission end surface is larger than a layer thickness of the light shielding portion, and the reflection surface reflects light to allocate light at a polar angle with a relatively high light flux amount among directions along prescribed azimuth angles in the display surface to light at a polar angle with relatively low luminance among directions along prescribed azimuth angles.

In the display device, given that the polar angle with a largest light flux amount among the directions along the prescribed azimuth angles is set as $\theta_1$, the polar angle at which normalized luminance of the display panel is 10% or lower in a range where the polar angle is −60° to 60° among the directions along the prescribed azimuth angles is set as $\theta_2$, a refractive index of a film main body that includes the base material and the light control layer is set as n, and an angle formed between the light incident end surface and the reflection surface is set as $\theta_3$, the light control layer may be configured to satisfy equation (1).

[Expression 2]

$$-\sin\theta_2 = n \times \sin\left\{\arcsin\left(\frac{\sin\theta_1}{n}\right) + 2(90° - \theta_3)\right\} \quad (1)$$

In the display device, the light control layer may have anisotropy that diffuses light which is emitted from the display panel in an anisotropic manner, and an azimuth angle direction in which the anisotropy is relatively high and the prescribed azimuth angle in the display surface may be arranged to be approximately parallel.

In the display device, the light control layer may include the plural light shielding portions and a light diffusion portion that is formed on one surface of the base material in a region other than regions where the light shielding portions are formed, and the light diffusion portion may include the light emission end surface, the light incident end surface, and the reflection surface.

In the display device, planar shapes of the plural light shielding portions as seen in a normal direction of one surface of the base material may be anisotropic shapes that have at least a major axis and a minor axis, and a direction along the minor axis of at least a portion of the plural light shielding portions and the prescribed azimuth angle in the display surface may be approximately parallel.

In the display device, the planar shape of the light shielding portion as seen in a normal direction of one surface of the base material may be a circle or a polygon.

In the display device, the light shielding portions may have at least one of plural kinds of sizes and shapes that are mutually different as seen in the normal direction of one surface of the base material.

In the display device, a hollow portion that is defined by the region where the light diffusion portion is formed may be formed in the region where the light shielding portion is formed, and air may be present in the hollow portion.

In the display device, the light control layer may include plural light diffusion portions that are formed on one surface of the base material and the light shielding portion that is formed on one surface of the base material in a region other than regions where the light diffusion portions are formed, and the light diffusion portion may include the light emission end surface, the light incident end surface, and the reflection surface.

In the display device, planar shapes of the plural light diffusion portions as seen in a normal direction of one surface of the base material may be anisotropic shapes that have at least a major axis and a minor axis, and a direction along the minor axis of at least a portion of the plural light diffusion portions and the prescribed azimuth angle in the display surface may be approximately parallel.

In the display device, the planar shape of the light diffusion portion as seen in the normal direction of one surface of the base material may be a circle or a polygon.

In the display device, the plural light diffusion portions may have at least one of plural kinds of sizes and shapes that are mutually different as seen in the normal direction of one surface of the base material.

In the display device, air may be present in spaces among the plural light diffusion portions.

In the display device, the display panel may have plural pixels that configure a displayed image, and a maximum pitch between the adjacent light diffusion portions among the plural light diffusion portions may be shorter than a pitch between the pixels of the display panel.

In the display device, the display panel may be a liquid crystal panel, and a display mode of the liquid crystal panel may be a twisted nematic mode.

Advantageous Effects of Invention

Aspects of the present invention may provide a light control film and a display device that improve the contrast and thereby provide high display quality.

DESCRIPTION OF EMBODIMENTS (First Embodiment)

A first embodiment of the present invention will hereinafter be described with reference to FIGS. 1 to 11.

In this embodiment, a description will be made about an example of a liquid crystal display device that includes a liquid crystal panel (display body) of a transmissive type as a display device.

In all the following drawings, elements are illustrated with different scales of dimensions for easy understanding of the elements.

Figure 1:
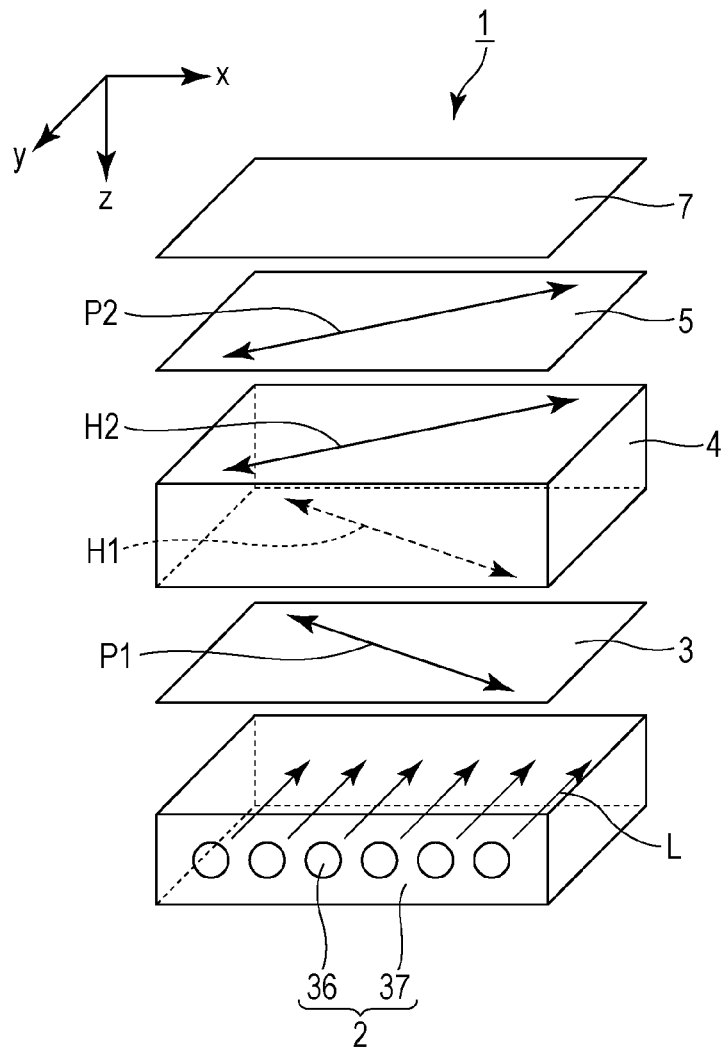
FIG. 1 is a perspective view of a liquid crystal display device of a first embodiment as seen from obliquely above (from a visually recognized side).
Figure 2:
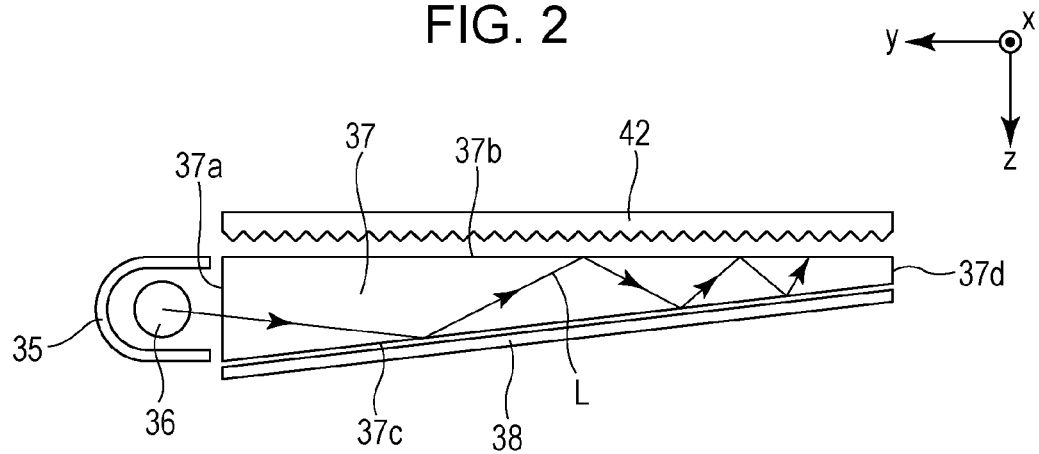
FIG. 2 is a cross-sectional view of the liquid crystal display device.

FIG. 1 is a perspective view of the liquid crystal display device of this embodiment as seen from obliquely above (from a visually recognized side). FIG. 2 is a cross-sectional view of the liquid crystal display device.

The liquid crystal display device 1 of this embodiment is configured with a backlight 2 (lighting device), a first polarizing plate 3, a liquid crystal panel (display panel) 4, a second polarizing plate 5, and a light control film 7. FIG. 1 schematically illustrates the liquid crystal panel 4 as a single plate, but the detailed structure thereof will be described below.

An observer views display from an upper side of the liquid crystal display device 1 in FIG. 1 in which the light control film 7 is arranged. In a description made below, the side on which the light control film 7 is arranged will be referred to as the visually recognized side, and the side on which the backlight 2 is arranged will be referred to as a back side. Further, in the description made below, the x axis is defined as the horizontal direction of a screen of the liquid crystal display device, the y axis is defined as the vertical direction of the screen of the liquid crystal display device, and the z axis is defined as the thickness direction of the liquid crystal display device.

The liquid crystal display device 1 of this embodiment modulates the light emitted from the backlight 2 by the liquid crystal panel 4 and displays prescribed images, characters, and the like by the modulated light. Further, when the light emitted from the liquid crystal panel 4 is transmitted by the light control film 7, light is emitted from the light control film 7 while the light distribution of the emitted light becomes wider than before the incidence on the light control film 7. This allows the observer to visually recognize display with a wider viewing angle.

Hereinafter, a specific configuration of the liquid crystal panel 4 will be described.

Here, a description will be made about an active matrix liquid crystal panel of the transmissive type as one example. However, liquid crystal panels that are applicable to the present invention are not limited to active matrix liquid crystal panels of the transmissive type. The liquid crystal panel that is applicable to the present invention may be a liquid crystal panel of a semi-transmissive type (transmissive-reflective combined type), for example, and may further be a simple matrix liquid crystal panel in which each of pixels includes no switching thin film transistor (hereinafter abbreviated as TFT).

Figure 3:
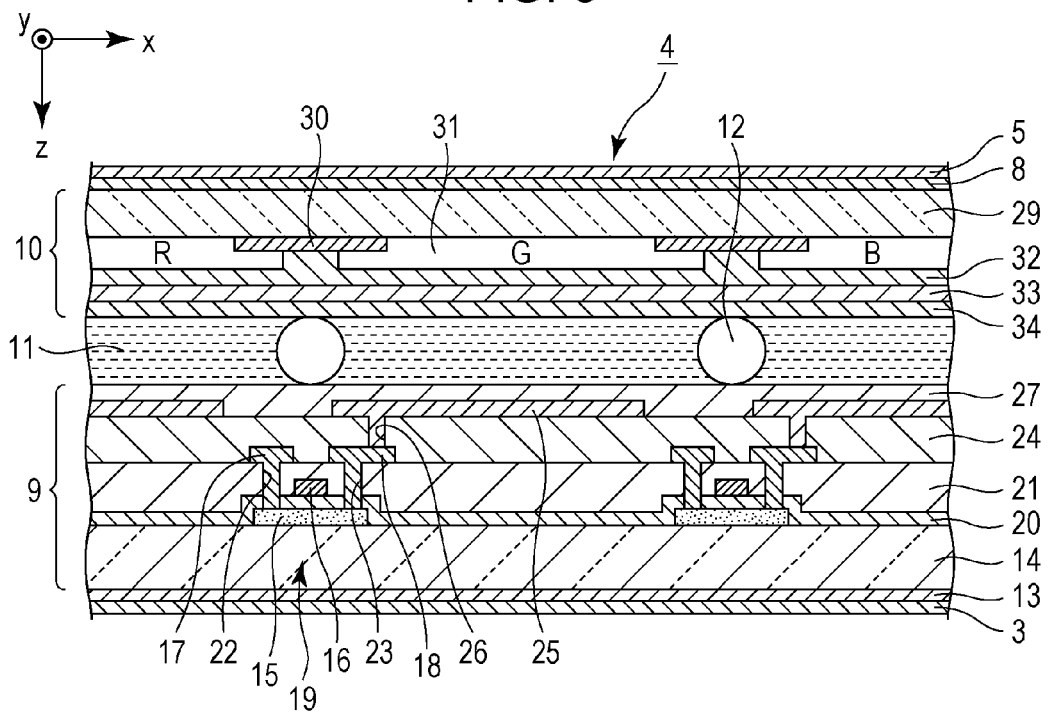
FIG. 3 is a vertical cross-sectional view of a liquid crystal panel.

FIG. 3 is a vertical cross-sectional view of the liquid crystal panel 4.

As illustrated in FIG. 3, the liquid crystal panel 4 has a TFT substrate 9 as a switching element substrate, a color filter substrate 10 that is arranged to face the TFT substrate 9, and a liquid crystal layer 11 that is interposed between the TFT substrate 9 and the color filter substrate 10. The liquid crystal layer 11 is sealed in a space surrounded by the TFT substrate 9, the color filter substrate 10, and a frame-shaped sealing member (not illustrated) that attaches the TFT substrate 9 and the color filter substrate 10 together at a prescribed interval. The liquid crystal panel 4 of this embodiment performs display in a twisted nematic (TN) mode, for example, and liquid crystals with positive dielectric anisotropy are used for the liquid crystal layer 11. Spherical spacers 12 are arranged between the TFT substrate 9 and the color filter substrate 10 to maintain a regular interval between those substrates.

Examples of display modes of the liquid crystal panel may include a vertical alignment (VA) mode, a super twisted nematic (STN) mode, an in-plane switching (IPS) mode, a fringe field switching (FFS) mode, and so forth other than the TN mode.

Plural pixels (not illustrated) as minimum unit areas of display are arranged in the TFT substrate 9 in a matrix manner. In the TFT substrate 9, plural source bus lines (not illustrated) are formed to extend in parallel with each other, and plural gate bus lines (not illustrated) are formed to extend in parallel with each other and orthogonally to the plural source bus lines. Accordingly, on the TFT substrate 9, the plural source bus lines and the plural gate bus lines are formed in a lattice manner. A rectangular area defined by the adjacent source bus lines and the adjacent gate bus lines becomes a single pixel. The source bus lines are connected with a source electrode of a TFT, which will be described below. The gate bus lines are connected with a gate electrode of the TFT.

A TFT 19 that has a semiconductor layer 15, a gate electrode 16, a source electrode 17, a drain electrode 18, and so forth is formed on a surface on the liquid crystal layer 11 side of a transparent substrate 14 that configures the TFT substrate 9. A glass substrate may be used for the transparent substrate 14, for example. The semiconductor layer 15 that is formed of semiconductor materials such as continuous grain silicon (CGS), low-temperature poly-silicon (LPS), and amorphous silicon (α-Si) is formed on the transparent substrate 14. Further, a gate insulating film 20 is formed to cover the semiconductor layer 15 on the transparent substrate 14. Examples of materials of the gate insulating film 20 may include a silicon oxide film, a silicon nitride film, or a laminated film of those, and so forth.

The gate electrode 16 is formed to face the semiconductor layer 15 on the gate insulating film 20. Examples of materials of the gate electrode 16 may include a laminated film of tungsten (W)/tantalum nitride (TaN), molybdenum (Mo), titanium (Ti), aluminum (Al), and so forth.

A first interlayer insulating film 21 is formed to cover the gate electrode 16 on the gate insulating film 20. Examples of materials of the first interlayer insulating film 21 may include a silicon oxide film, a silicon nitride film, or a laminated film of those, and so forth. The source electrode 17 and the drain electrode 18 are formed on the first interlayer insulating film 21. The source electrode 17 is connected with a source region of the semiconductor layer 15 via a contact hole 22 that passes through the first interlayer insulating film 21 and the gate insulating film 20. Similarly, the drain electrode 18 is connected with a drain region of the semiconductor layer 15 via a contact hole 23 that passes through the first interlayer insulating film 21 and the gate insulating film 20. Conductive materials similar to the above-described gate electrode 16 are used as materials of the source electrode 17 and the drain electrode 18. A second interlayer insulating film 24 is formed to cover the source electrode 17 and the drain electrode 18 on the first interlayer insulating film 21. Materials similar to the above-described first interlayer insulating film 21 or organic insulating materials are used as materials of the second interlayer insulating film 24.

A pixel electrode 25 is formed on the second interlayer insulating film 24. The pixel electrode 25 is connected with the drain electrode 18 via a contact hole 26 that passes through the second interlayer insulating film 24. Thus, the pixel electrode 25 is connected with the drain region of the semiconductor layer 15 via the drain electrode 18 as a relay electrode. Examples of materials of the pixel electrode 25 may include transparent conductive materials such as indium tin oxide (ITO) and indium zinc oxide (IZO). This configuration allows scanning signals to be supplied through the gate bus line and image signals supplied to the source electrode 17 through the source bus line to be supplied to the pixel electrode 25 via the semiconductor layer 15 and the drain electrode 18 when the TFT 19 becomes an ON state. Further, an alignment film 27 is formed on the whole surface of the second interlayer insulating film 24 to cover the pixel electrodes 25. This alignment film 27 has alignment regulating force that causes liquid crystal molecules which configure the liquid crystal layer 11 to be horizontally aligned. A mode of the TFT may be a bottom gate type TFT, which is illustrated in FIG. 3, or a top gate type TFT.

Meanwhile, a black matrix 30, a color filter 31, a planarization layer 32, a counter electrode 33, and an alignment film 34 are sequentially formed on the surface on the liquid crystal layer 11 side of a transparent substrate 29 that configures the color filter substrate 10. The black matrix 30 has a function of blocking transmission of light in regions among the pixels and is formed of a photoresist in which metal such as a multilayer film of chromium (Cr) or Cr/Cr oxide or carbon particles are dispersed in a photosensitive resin. The color filter 31 contains pigments of colors of red (R), green (G), and blue (B). Any one of the color filters 31 of R, G, and B is arranged to face the single pixel electrode 25 on the TFT substrate 9. The planarization layer 32 is configured with an insulating film that covers the black matrices 30 and the color filters 31 and has a function of reducing unevenness caused by the black matrices 30 and the color filters 31 for planarization. The counter electrode 33 is formed on the planarization layer 32. Transparent conductive materials similar to the pixel electrode 25 are used as materials of the counter electrode 33. Further, the alignment film 34 that has horizontal alignment regulating force is formed on the whole surface of the counter electrode 33. The color filters 31 may be configured with multiple colors of three colors of R, G, and B or more.

As illustrated in FIG. 2, the backlight 2 includes a light source 36 such as a light-emitting diode or a cold cathode tube, a light guide 37 formed of an acrylic resin or the like, a reflector 35, a reflection sheet 38, and a prism sheet 42. The light source 36 is arranged on one end surface 37a of the light guide 37 whose planar shape is rectangular and emits light toward the end surface 37a of the light guide 37. The light guide 37 propagates the light incident from the end surface 37a in an internal portion and emits the light from a front surface 37b. The reflector 35 reflects the light emitted from the light source 36 in directions other than toward the end surface 37a of the light guide 37 toward the end surface 37a of the light guide 37. The reflection sheet 38 reflects the light emitted from a back side 37c of the light guide 37 to cause the light to be again incident from the back side 37c of the light guide 37. The prism sheet 42 includes plural prism structures 42a in a triangular prism shape that are arranged in parallel with each other. When light is incident from the front surface 37b of the light guide 37, the prism sheet 42 changes the traveling direction of the light to a direction close to the normal direction of the liquid crystal panel 4 and causes the light to be emitted. The backlight 2 of this embodiment is a backlight of an edge light type in which the light source 36 is arranged on the end surface 37a of the light guide 37.

The backlight 2 of this embodiment is a backlight that causes light to have directivity by controlling the emission direction of the light, which is a so-called directional backlight. Specifically, the thickness of the light guide 37 becomes gradually thinner from the end surface 37a on which the light source 36 is arranged toward an end surface 37d on the opposite side. That is, the front surface 37b and the back surface 37c of the light guide 37 are not mutually parallel, and the shape of the light guide 37 as seen from a side is a wedge shape. The light incident from the end surface 37a of the light guide 37 travels through the internal portion in the y axis direction while repeating reflection between the front surface 37b and the back surface 37c of the light guide 37. Hypothetically, if the light guide were a parallel flat plate, the incident angle to the front surface and the back surface of the light guide would be the same regardless of the frequency of the reflection. In contrast, as this embodiment, in a case where the light guide 37 is wedge-shaped, the incident angle becomes smaller each time when the light is reflected by the front surface 37b or the back surface 37c of the light guide 37.

In this case, for example, given that the refractive index of the acrylic resin that configures the light guide 37 is 1.5 and the refractive index of the air is 1.0, the critical angle on the front surface 37b of the light guide 37, that is, the critical angle at the interface between the acrylic resin that configures the light guide 37 and the air becomes approximately 42° in accordance with Snell's law. As long as the incident angle of light L on the front surface 37b is larger than the critical angle of 42° in a case where the light is incident on the front surface 37b immediately after the incidence on the light guide 37, the total reflection condition is satisfied, and the light L is totally reflected by the front surface 37b. Thereafter, at the point when the light L repeats total reflection between the front surface 37b and the back surface 37c and the incident angle of the light L on the front surface 37b becomes smaller than the critical angle of 42°, the total reflection condition is not satisfied, and the light L is emitted to an external space. Accordingly, the light L is emitted with a substantially regular exit angle at the front surface 37b of the light guide 37. As described above, the backlight 2 has narrow light distribution in the yz plane and provides directivity in the yz plane. On the other hand, the backlight 2 has wider light distribution in the xz plane than the light distribution in the yz plane and does not provide directivity in the xz plane.

The first polarizing plate 3 that functions as a polarizer is provided between the backlight 2 and the liquid crystal panel 4. Here, if an angle is counterclockwise expressed with the positive direction in the x axis direction as the reference, a transmission axis P1 of the first polarizing plate 3 is set to 135° to 315° directions. The second polarizing plate 5 that functions as an analyzer is provided between the liquid crystal panel 4 and the light control film 7. A transmission axis P2 of the second polarizing plate 5 is arranged orthogonally to the transmission axis P1 of the first polarizing plate 3 and is set to 45° to 225° directions. The transmission axis P1 of the first polarizing plate 3 and the transmission axis P2 of the second polarizing plate 5 are in crossed Nichol arrangement.

Figure 4:
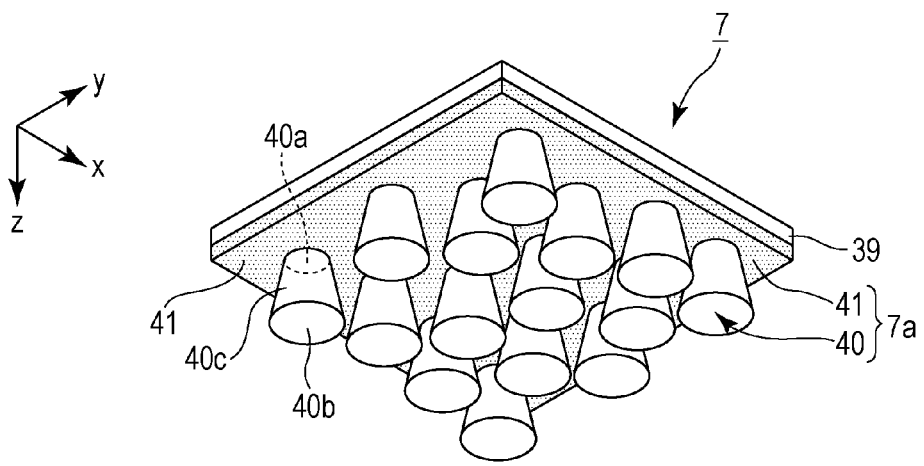
FIG. 4 is a perspective view of a light control film in a backlight direction.

FIG. 4 is a perspective view of the light control film 7 in a backlight direction.

As illustrated in FIG. 4, the light control film 7 includes a base material 39 and a light control layer 7*a* that is formed on one surface of the base material 39 (the surface on the opposite side to the visually recognized side) and controls the emission direction of light by diffusing the light from the liquid crystal panel 4. The light control layer 7*a* is configured with plural light diffusion portions 40 and a light shielding layer 41 (light shielding portion) formed on one surface of the base material 39. The light control film 7 is arranged on the second polarizing plate 5 in a position in which the side provided with the light diffusion portions 40 is directed to the second polarizing plate 5 and the side of the base material 39 is directed to the visually recognized side. The light control film 7 is fixed to the second polarizing plate 5 via an adhesive layer (not illustrated).

For example, base materials formed of transparent resins such as a triacetylcellulose (TAC) film, polyethylene terephthalate (PET), polycarbonate (PC), polyethylene naphthalate (PEN), and polyethersulfone (PES) films are preferably used for the base material 39. In a manufacturing process, the base material 39 serves as a foundation onto which the materials of the light shielding layer 41 and the light diffusion portions 40 are coated and thus has to have heat resistance and mechanical strength to a heat treatment step in the manufacturing process. Accordingly, a base material formed of glass or the like may be used for the base material 39 other than the base material formed of a resin. However, the thickness of the base material 39 is preferably thin to the extent that the heat resistance and the mechanical strength are not impaired. The reason is because the thicker base material 39 may cause blurry display. Further, the total light transmittance of the base material 39 is preferably 90% or higher in accordance with the specification of JIS K7361-1. The total light transmittance of 90% or higher provides sufficient transparency. In this embodiment, a base material formed of a transparent resin in a thickness of 100 μm is used as one example.

The light diffusion portion 40 is configured with an organic material that is transparent and photosensitive such as an acrylic resin or an epoxy resin, for example. Further, the total light transmittance of the light diffusion portion 40 is preferably 90% or higher in accordance with the specification of JIS K7361-1. The total light transmittance of 90% or higher provides sufficient transparency. The horizontal cross-sectional (xy cross-sectional) shape of the light diffusion portion 40 is circular. The area of a surface 40*a* on the base material 39 side that serves as a light emission end surface is small, and the area of a surface 40*b* on the opposite side to the base material 39 that serves as a light incident end surface is large. The area of the horizontal cross section becomes gradually larger from the base material 39 side toward the opposite side to the base material 39. That is, the light diffusion portion 40 is in a so-called inversely tapered and truncated cone shape as seen from the base material 39 side.

The light diffusion portion 40 is a portion that contributes to transmission of light in the light control film 7. That is, the light incident on the light diffusion portion 40 is totally reflected by a tapered side surface (reflection surface) 40*c* of the light diffusion portion 40, guided while being substantially trapped in an internal portion of the light diffusion portion 40, and then emitted. The plural light diffusion portions 40 are arranged at random (aperiodically) as seen in the normal direction of a main surface of the base material 39.

The intervals (pitches) of the light diffusion portions 40 are preferably shorter than the intervals (pitches: 25 μm, for example) of the pixels of the liquid crystal panel 4. Accordingly, at least one light diffusion portion 40 is formed in the pixel. Thus, a wide viewing angle may be expected when the light diffusion portions 40 are combined with a liquid crystal panel with short pixel pitches that is used for a mobile apparatus or the like, for example.

The light control film 7 is arranged such that the base material 39 is directed to the visually recognized side. Thus, between two facing surfaces of the light diffusion portion 40 in the truncated cone shape, the surface with the smaller area becomes a light emission end surface 40*a*, and the surface with the larger area becomes a light incident end surface 40*b*. In this embodiment, the inclination angle of the side surface 40*c* of the light diffusion portion 40 (the angle formed between the light emission end surface 40*a* and the side surface 40*c*) is configured to satisfy the conditions that will be described below.

The light shielding layer 41 is formed in a region other than regions where the plural light diffusion portions 40 are formed, on the surface of the base material 39 on the side where the light diffusion portions 40 are formed. The light shielding layer 41 is configured with an organic material that is light-absorbing and photosensitive such as a black resist or black ink, for example. Other than that, a metal film such as a multilayer film of chromium (Cr) or Cr/Cr oxide. The layer thickness of the light shielding layer 41 is configured to be thinner than the height from the light incident end surface 40*b* to the light emission end surface 40*a* of the light diffusion portion 40. In the case of this embodiment, the layer thickness of the light shielding layer 41 is approximately 150 nm as one example, and the height from the light incident end surface 40*b* to the light emission end surface 40*a* of the light diffusion portion 40 is approximately 25 μm as one example. In gaps among the plural light diffusion portions 40, the light shielding layer 41 is present in a portion that contacts with one surface of the base material 39, and air is present in the other portions.

It is preferable that the refractive index of the base material 39 and the refractive index of the light diffusion portion 40 are substantially equivalent. The reason is because, for example, in a case where the refractive index of the base material 39 is largely different from the refractive index of the light diffusion portion 40, unnecessary refraction or reflection of light occurs at the interface between the light diffusion portion 40 and the base material 39 when the light incident from the light incident end surface 40*b* is emitted from the light diffusion portion 40, and this may result in problems such as difficulty in obtaining a desired viewing angle and a decrease in the amount of emitted light.

In the case of this embodiment, air is interposed among the adjacent light diffusion portions 40. Thus, the side surface 40*c* of the light diffusion portion 40 is the interface between a transparent acrylic resin and air in a case where the light diffusion portions 40 are formed of the transparent acrylic resin, for example. Here, the periphery of the light diffusion portions 40 may be filled with another material with a low refractive index. However, the difference in the refractive index at the interface between the internal portion and the external portion of the light diffusion portion 40 becomes the maximum in the case where air is present compared to cases where any material with a low refractive index is present in the external portion. Thus, in accordance with Snell's law, the critical angle becomes smallest in the configuration of this embodiment, and the incident angle range where light is totally reflected by the side surface 40c of the light diffusion portion 40 becomes widest. As a result, loss of light may be further reduced, and high luminance may be obtained.

Returning to FIG. 1, an alignment treatment such as rubbing is applied to the alignment film 27 of the TFT substrate 9 such that alignment control directions are 135° to 315° directions. The alignment control direction of the alignment film 27 is indicated by arrow H1. Meanwhile, the alignment treatment such as rubbing is applied to the alignment film 34 of the color filter substrate 10 such that the alignment control directions are 45° to 225° directions. The alignment control direction of the alignment film 34 is indicated by arrow H2.

Figure 5A:
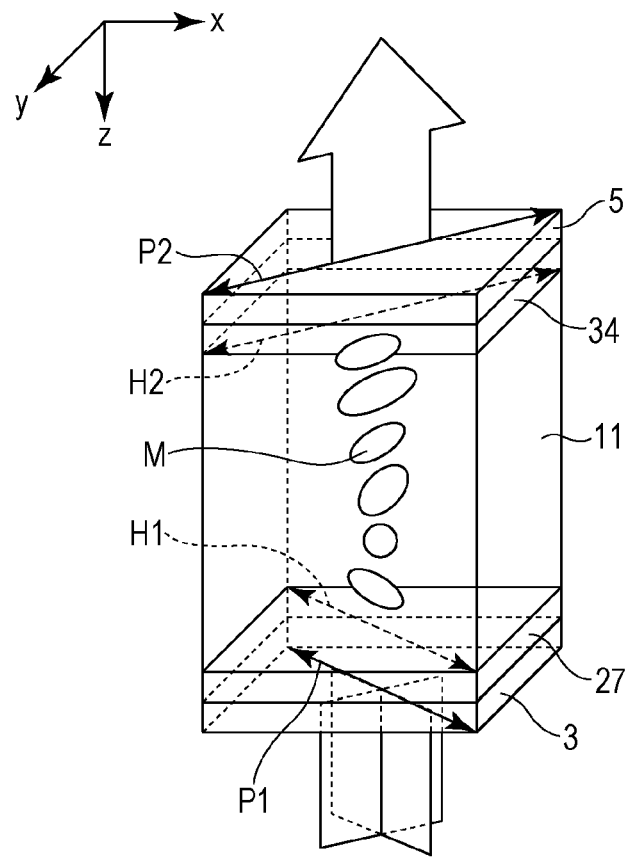
FIG. 5A is an operation explanation diagram of the liquid crystal panel.

As illustrated in FIG. 5A, when a voltage is not applied between the pixel electrode 25 and the counter electrode 33, liquid crystal molecules M that configure the liquid crystal layer 11 are twisted at 90° between the two alignment films 27 and 34. Here, the polarization plane of linearly polarized light transmitted by the first polarizing plate 3 that has the transmission axis P1 of 135° to 315° directions is rotated by 90° by optical rotation of the liquid crystal layer 11, and the light is transmitted by the second polarizing plate 5 that has the transmission axis P2 of 45° to 225° directions. As a result, display becomes white when no voltage is applied.

Figure 5B:
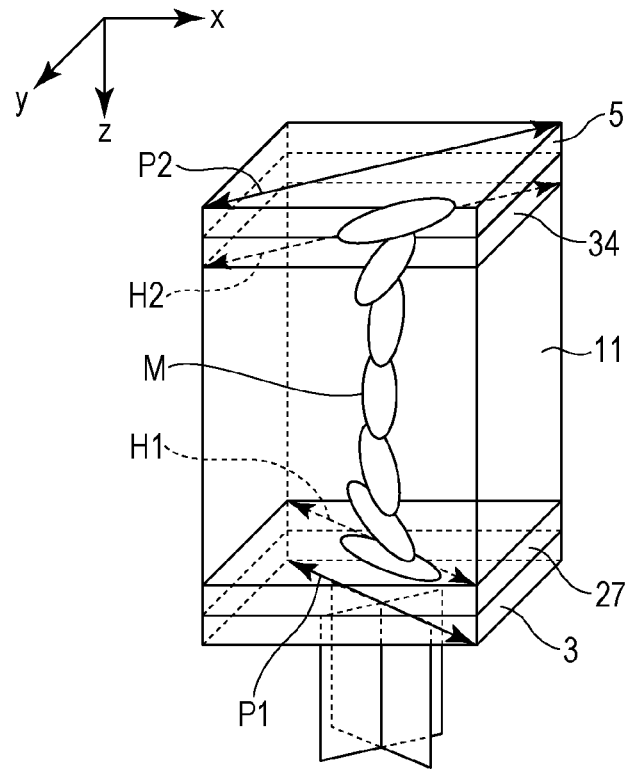
FIG. 5B is an operation explanation diagram of the liquid crystal panel.

As illustrated in FIG. 5B, when a voltage is applied between the pixel electrode 25 and the counter electrode 33, the liquid crystal molecules M that configure the liquid crystal layer 11 stand along the electric field between the two alignment films 27 and 34. Here, the polarization plane of linearly polarized light transmitted by the first polarizing plate 3 that has the transmission axis P1 of 135° to 315° directions is not rotated, and thus the light is not transmitted by the second polarizing plate 5 that has the transmission axis P2 of 45° to 225° directions. As a result, display becomes black when a voltage is applied. As described above, application or no application of a voltage is controlled for each of the pixels to switch display between white and black, and an image may thereby be displayed.

Incidentally, the liquid crystal panel 4 of the liquid crystal display device 1 has viewing angle characteristics that correspond to display modes. Thus, the contrast ratio (luminance) of a displayed image becomes different depending on the angle of viewing.

In this embodiment, the light control film 7 employs a structure (taper angle) that satisfies relational expressions, which will be described below, thereby makes the change in the viewing angle characteristics of the liquid crystal panel 4 milder, and allows high display characteristics to be obtained by balancing the viewing angle characteristics.

In a description made below, a description will be made about an example where the light control film 7 corresponds to the viewing angle characteristics of the liquid crystal panel 4 that performs display in the TN mode. However, the light control film of this embodiment employs a structure that satisfies the relational expressions, which will be described below, to correspond to the display mode of the liquid crystal panel and may thereby obtain high display characteristics by balancing the viewing angle characteristics in all display modes.

Figure 6A:
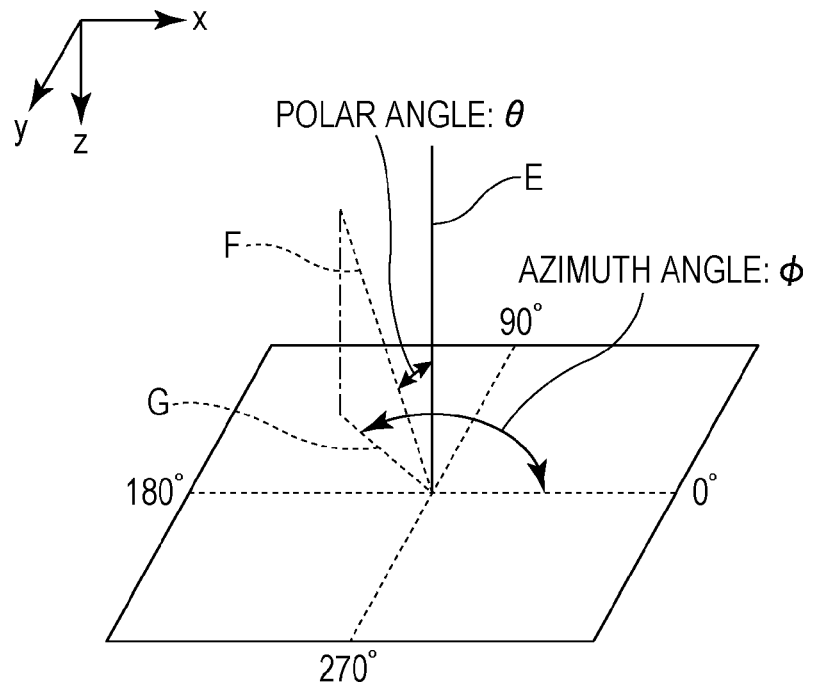
FIG. 6A is a diagram for defining azimuth angle and polar angle directions of the liquid crystal display device.

Here, as illustrated in FIG. 6A, it is assumed that the angle formed by an eye direction F of the observer with respect to the normal direction E of a display surface of the liquid crystal display device 1 as a reference is set as a polar angle θ and the angle formed by the direction of a line segment G when the eye direction F of the observer with respect to the positive direction (0° direction) of the x axis as a reference is projected onto a screen is set as an azimuth angle φ.

Figure 6B:
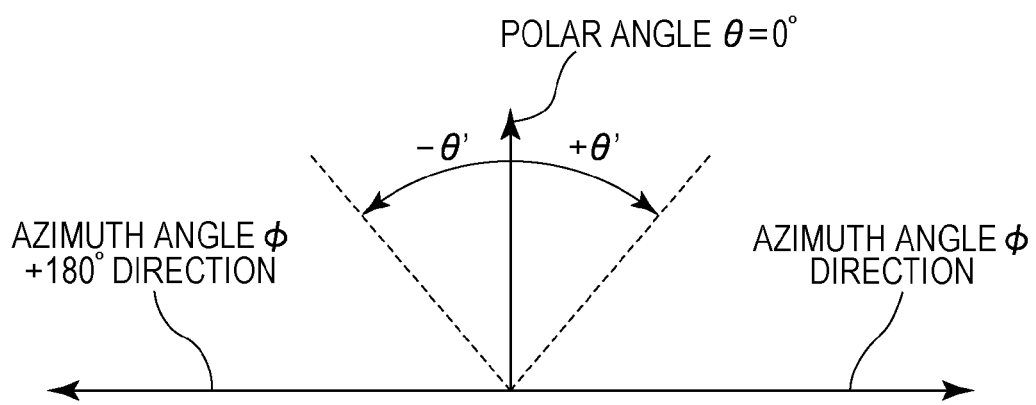
FIG. 6B is a diagram for defining the azimuth angle and polar angle directions of the liquid crystal display device.

Further, as illustrated in FIG. 6B, in an arbitrary azimuth angle direction φ of the screen of the liquid crystal display device 1, assuming that polar angle θ=0° is a reference, the polar angle in φ° direction is specified as + (positive) θ', and the polar angle in φ+180° direction is specified as − (negative) θ'.

The display surface of the liquid crystal display device 1 may be assumed as substantially same as a display surface of the liquid crystal panel 4. Thus, in a description made below, a description will be made on an assumption that the directions of the azimuth angle and the polar angle on the display surface of the liquid crystal display device 1 correspond with the directions of the azimuth angle and the polar angle on the display surface of the liquid crystal panel 4.

Figure 7:
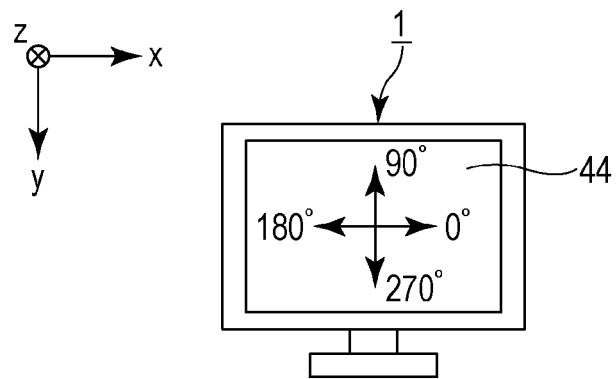
FIG. 7 is a front view of the liquid crystal display device.

As illustrated in FIG. 7, the horizontal direction (x axis direction) on a display surface 44 of the liquid crystal display device 1 is set as the azimuth angle φ: 0° to 180° directions, and the vertical angle (y axis direction) is set as the azimuth angle φ: 90° to 270° directions.

Figure 8:
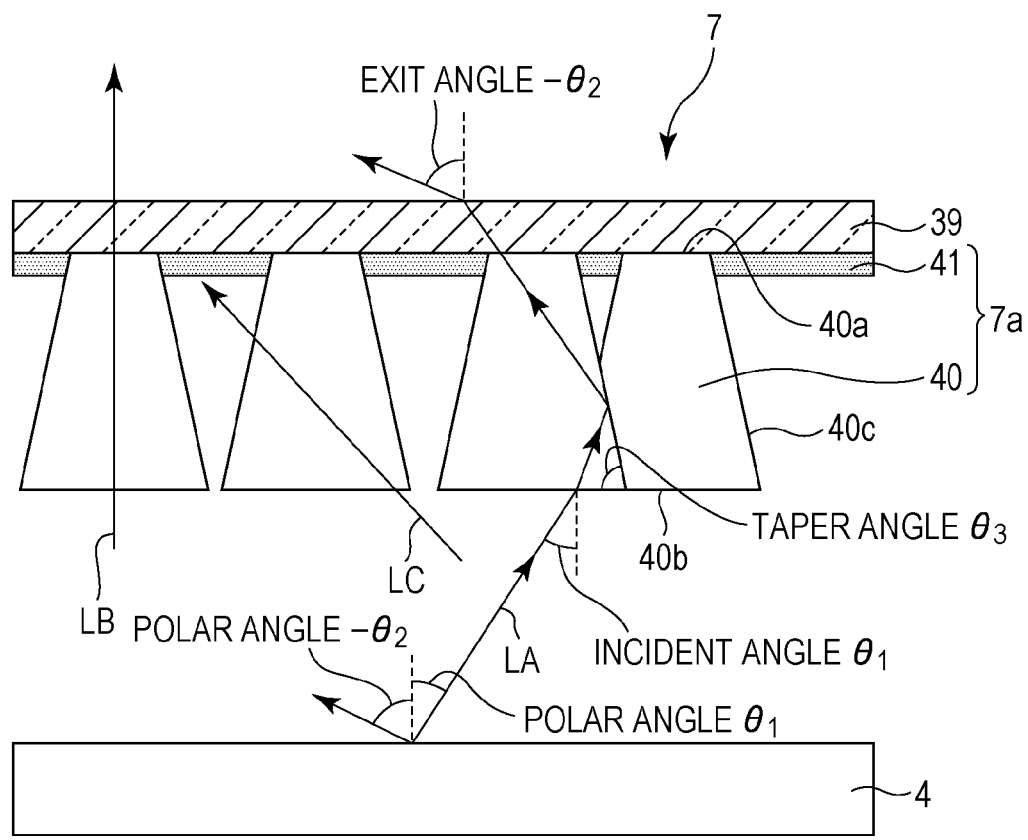
FIG. 8 is a diagram that illustrates a cross-sectional configuration of the light control film.

FIG. 8 is a diagram that illustrates a cross-sectional configuration of the light control film 7 (light diffusion portions 40). In FIG. 8, for easy understanding of the drawing, the second polarizing plate 5 is not illustrated, and the liquid crystal panel 4 and the light control film 7 are illustrated in a separated state. In this embodiment, because the light diffusion portion 40 has a so-called inversely tapered and truncated cone shape as seen from the base material 39 side, the cross-sectional configuration is the same regardless of the azimuth angle direction.

As indicated by arrow LA in FIG. 8, the incident light that is incident on the side surface 40c of the light diffusion portion 40 at an angle exceeding the critical angle is totally reflected by the side surface 40c, transmitted by the light diffusion portion 40, and emitted to the observer side. Here, the incident direction of the incident light that is incident on the side surface 40c at an angle exceeding the critical angle to the light incident end surface 40b may be specified as the direction of an incident angle $\theta_1$. Meanwhile, the incident light is transmitted by the light diffusion portion 40 and emitted from the base material 39 in the 180° opposite direction to the incident direction. Thus, the emission direction of the light emitted from the base material 39 may be specified as the direction of an exit angle $-\theta_2$. The angle formed between the side surface 40c of the light diffusion portion 40 and the light incident end surface 40b may be specified as a taper angle $\theta_3$. In this embodiment, among the plural light diffusion portions 40, the taper angle $\theta_3$ of the side surface 40c of each of the light diffusion portions 40 is the same for the plural light diffusion portions 40.

Meanwhile, as indicated by arrow LB in FIG. 8, the incident light that is transmitted by the light diffusion portion 40 without being incident on the side surface 40c is emitted to the observer side without a change. Further, as indicated by arrow LC in FIG. 8, the incident light that is incident on the side surface 40c of the light diffusion portion 40 at an angle of the critical angle or smaller does not go through total reflection but is transmitted by the side surface 40c of the light diffusion portion 40. Here, because the light shielding layer 41 is provided in the region other than the regions where the light diffusion portions 40 are formed, the light transmitted by the side surface 40c of the light diffusion portion 40 is absorbed by the light shielding layer 41. Accordingly, blurry display or a decrease in the contrast does not occur. However, in a case where the light transmitted by the side surface 40c of the light diffusion portion 40 increases, an image with high luminance may not be obtained due to loss of the amount of light. Thus, in this embodiment, the backlight that emits light that is not incident on the side surface 40c of the light diffusion portion 40 at an angle of the critical angle or smaller, that is, a so-called backlight with directivity is used.

Figure 9A:
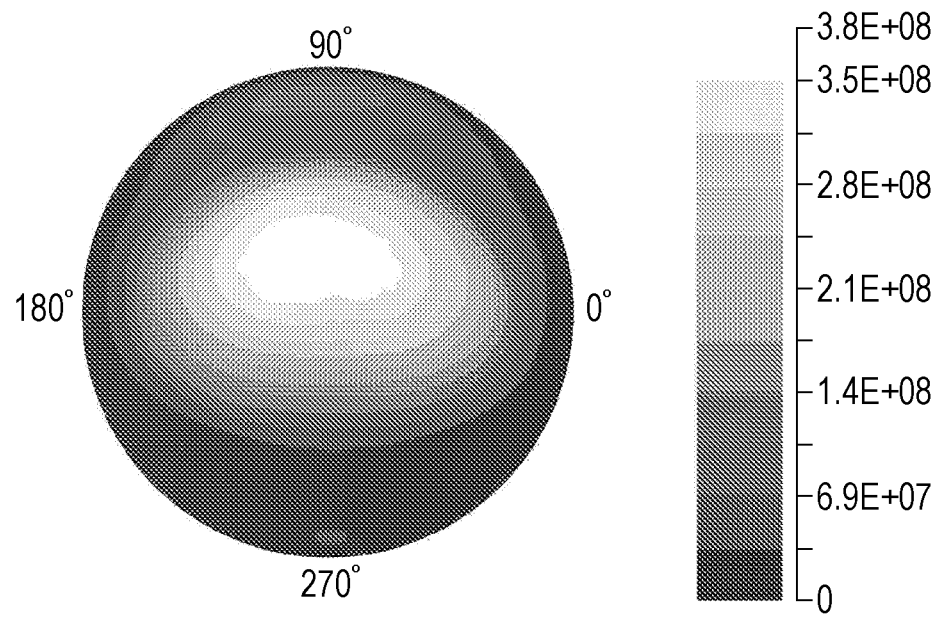
FIG. 9A is a diagram that illustrates the luminance distribution on a display surface of the liquid crystal panel alone.
Figure 9B:
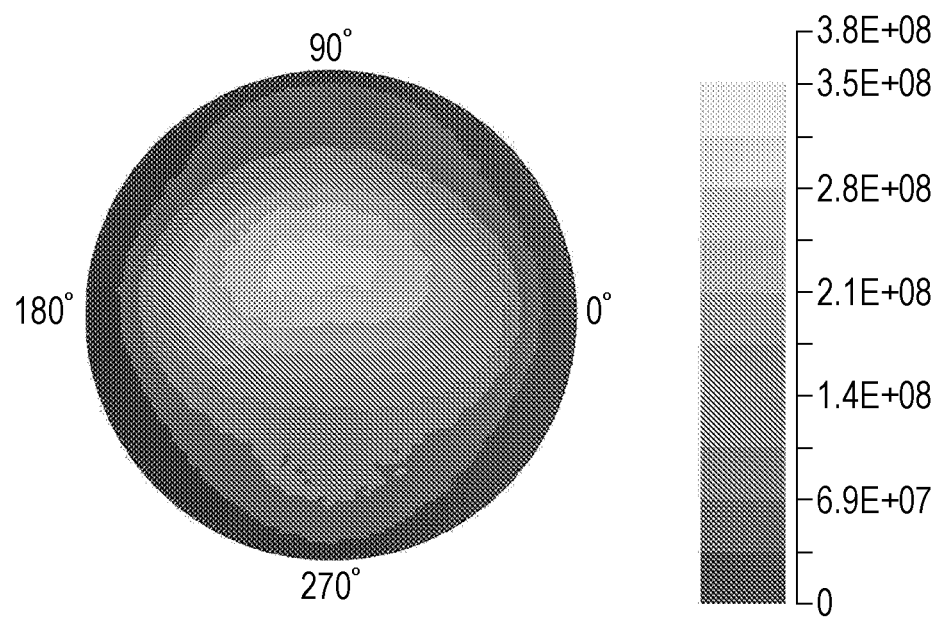
FIG. 9B is a diagram that illustrates the luminance distribution on a display surface of the liquid crystal display device.

FIG. 9A is a diagram that illustrates the luminance distribution on the display surface of the liquid crystal panel 4 alone. FIG. 9B is a diagram that illustrates the luminance distribution on the display surface of the liquid crystal display device 1 that includes the light control film 7.

In FIGS. 9A and 9B, the visibility of the displayed image is determined to be better as the luminance value is larger.

As illustrated in FIG. 9A, the liquid crystal panel 4 has the luminance distribution in a generally symmetrical shape in the azimuth angle ϕ: 0° to 180° directions but has the luminance distribution in an asymmetrical shape in the azimuth angle ϕ: 90° to 270° directions. That is, it may be determined that the change in the viewing angle characteristics is large in the azimuth angle ϕ: 90° to 270° directions in the liquid crystal panel 4.

Figure 10:
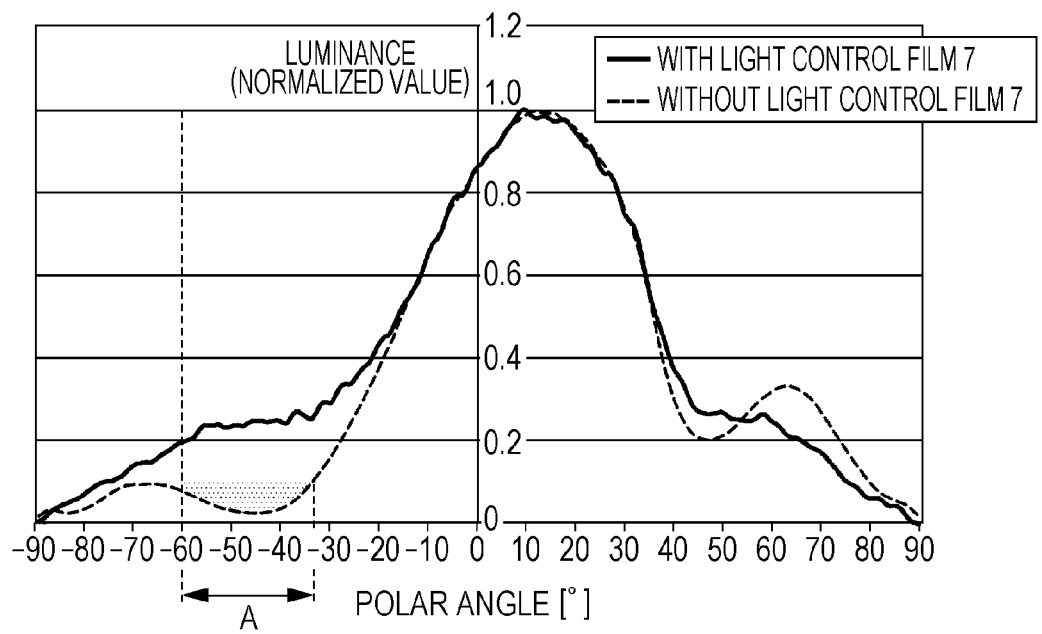
FIG. 10 is a graph that represents the difference in the luminance distribution at the azimuth angle $\phi$: 90° to 270° depending on with or without the light control film.

FIG. 10 is a graph that represents the luminance distribution at the azimuth angle ϕ: 90° to 270° where the change in the viewing angle characteristics is large with respect to the case with the light control film (liquid crystal display device) and the case without the light control film (liquid crystal panel alone). The horizontal axis of FIG. 10 is the polar angle [°], and the vertical axis of FIG. 10 is the luminance value (normalized value) in a case where the image of full white display is displayed on the screen.

As illustrated in FIG. 10, the liquid crystal panel 4 has a peak in the range where the polar angle is +10° to +20° but has low luminance in the range where the polar angle is −60° to −30°. As described above, in the liquid crystal panel 4, the change amount in the displayed image depending on the viewing angle is large at the azimuth angle ϕ: 90° to 270°. Thus, the visibility of the displayed image may not be high.

Accordingly, in the liquid crystal panel 4, it may be determined that the azimuth angle ϕ: 90° to 270° is the direction where the viewing angle characteristics are desired (need) to be improved.

Figure 11:
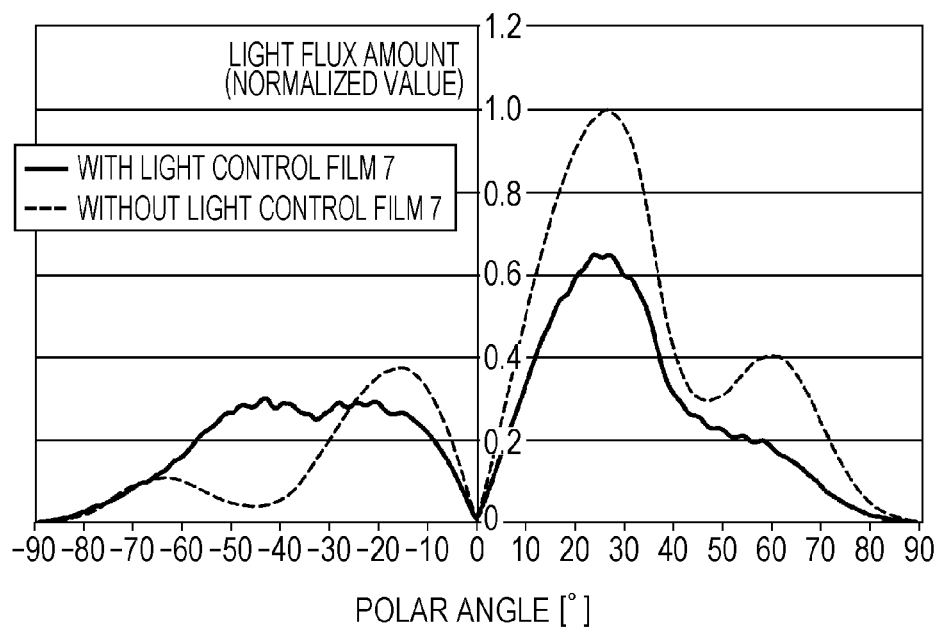
FIG. 11 is a graph that represents the difference in the light flux amount at the azimuth angle $\phi$: 90° to 270° depending on with or without the light control film.

FIG. 11 is a graph that represents the light flux amounts at the azimuth angle ϕ: 90° to 270° where the change in the viewing angle characteristics is large in FIG. 9A with respect to the case with the light control film (liquid crystal display device) and the case without the light control film (liquid crystal panel alone). The horizontal axis of FIG. 11 is the polar angle [°], and the vertical axis of FIG. 11 is the light flux amount in a case where the image of full white display is displayed on the screen.

As illustrated in FIG. 11, the liquid crystal panel 4 has a peak (polar angle $\theta_1$) in the range where the polar angle is +20° to +30°.

The light control film 7 according to this embodiment has a configuration in which the side surface 40c reflects light to allocate the light at the polar angles with a relatively high light flux amount among the directions along prescribed azimuth angles on the display surface of the liquid crystal panel 4 to the light at the polar angles with relatively low luminance among the directions along prescribed azimuth angles.

Here, the directions along the prescribed azimuth angles are appropriately configured in accordance with a request of a user. In this embodiment, as described above, the direction along the prescribed azimuth angle is configured as the direction where the viewing angle characteristics are desired (need) to be improved in the liquid crystal panel 4 (azimuth angle ϕ: 90° to 270° (Y direction)).

The light control film 7 according to this embodiment is configured such that the polar angle with the highest light flux amount among the directions (90° to 270° directions) along the prescribed azimuth angles in the liquid crystal panel 4, the polar angle at which the normalized luminance of the liquid crystal panel 4 is 10% or lower in the range where the polar angle is −60° to 60° among the directions along the prescribed azimuth angles, the refractive index of the light control film 7, and the angle formed between the light incident end surface 40b and the side surface 40c (hereinafter referred to as taper angle) satisfy a prescribed relational expression.

Specifically, as illustrated in FIG. 8, given that the polar angle with the highest light flux amount among the directions (90° to 270° directions) along the prescribed azimuth angles in the liquid crystal panel 4 is set as $\theta_1$, the polar angle at which the normalized luminance of the liquid crystal panel 4 is 10% or lower in the range where the polar angle is −60° to 60° among the directions along the prescribed azimuth angles is set as $\theta_2$, the refractive index of the light control film 7 is set as n, and the taper angle is set as $\theta_3$, the relational expression is provided by the following equation (1). The polar angle $\theta_1$ with the highest light flux amount is specified by the peak value indicated in FIG. 11.

[Expression 3]

$$-\sin\theta_2 = n \times \sin\left\{\arcsin\left(\frac{\sin\theta_1}{n}\right) + 2(90° - \theta_3)\right\} \quad (1)$$

As described above, the polar angle $\theta_2$ is specified by the range where the normalized luminance of the liquid crystal panel 4 is 10% or lower in the range where the polar angle is −60° to 60° among the directions along the prescribed azimuth angles.

Firstly, this is because the polar angle direction in which a person typically views the display is within ±60°.

Secondly, it is known that the perceived quantity in which a person perceives brightness is proportional to logarithm in accordance with Weber-Fechner law. Here, the equation of Weber-Fechner law is provided by the following equation (2). In the following equation (2), E is the perceived quantity of brightness, I is the intensity of stimulus (luminance), and k and C are both constants.

In the following equation (2), because the constant C is sufficiently small, it may be determined that the perceived value becomes ½ when the luminance becomes 1/10.

[Expression 4]

$$E = k \log I + C \quad (2)$$

Based on the two viewpoints described above, the inventors considered that in a case where the range where the normalized luminance of the liquid crystal panel 4 was 10% or lower in the range where the polar angle was −60° to 60° among the directions along the prescribed azimuth angles was specified as the polar angle $\theta_2$, a decrease in the brightness might sufficiently be perceived in actual viewing in such a range.

Based on the above description, the polar angle $\theta_2$ in the above equation (1) is specified by the values of the range indicated by two-way arrow A indicated in FIG. 10.

The above equation (1) specifies a configuration that allocates the light in the region where the light flux amount is relatively large (polar angle $\theta_1$) in the liquid crystal panel 4 to the region where the visibility of the displayed image is low due to relatively low luminance (polar angle).

That is, as illustrated in FIG. 8, the light control film 7 that includes the side surface 40c configured to satisfy the above equation (1) causes the light emitted from the display surface of the liquid crystal panel 4 at the polar angle $\theta_1$ (the light with relatively large light flux amount) to be incident on the light incident end surface 40b at the incident angle $\theta_1$ that is the same angle as the polar angle $\theta_1$. The light incident on the light incident end surface 40b is reflected by the side surface 40c and thereafter emitted from the base material 39. Then, the exit angle of the light emitted from the base material 39 is the same angle as the polar angle $\theta_2$ at which the luminance is relatively low in the liquid crystal panel 4. That is, the light control film 7 causes the light emitted from the display surface of the liquid crystal panel 4 at the polar angle $\theta_1$ to be reflected by the side surface 40c with the taper angle $\theta_3$ and may thereby cause the light to be emitted from the base material 39 in the direction of the polar angle 82.

In the above equation (1), because the polar angle 82 has a certain width as illustrated in FIG. 10, the taper angle $\theta_3$ also has a certain width. That is, there are plural taper angles $\theta_3$ that satisfy the above equation (1). Thus, even in a case where there are some variations in the taper angle $\theta_3$ of the side surface 40c of the light diffusion portion 40 due to manufacturing errors in manufacturing of the light control film 7, the taper angle $\theta_3$ that falls within the range which satisfies the above equation (1) may properly improve the viewing angle characteristics. Accordingly, the light control film 7 (light diffusion portion 40) tolerates the manufacturing errors to some extent, and the yield in manufacturing may be reduced.

As illustrated in FIG. 11, in the liquid crystal display device configured with the liquid crystal panel 4 alone, the light flux amount is large at the polar angle of 26° and small at the polar angles of −40° to −50°. On the other hand, as illustrated in FIG. 11, it may be observed that because the liquid crystal display device 1 includes the light control film 7, the light at the polar angle of 26° is largely decreased and allocated to the polar angles of −40° to −50°.

As illustrated in FIG. 10, in the liquid crystal display device configured with the liquid crystal panel 4 alone, the luminance is low at the polar angles of −60° to −30°. On the other hand, as illustrated in FIG. 10, in the liquid crystal display device 1 that has the light control film 7, the luminance may be improved in the range of the polar angles of −60° to −30° as a result of allocation of a portion of the light flux to the polar angles of −40° to −50°. As described above, it is considered that the liquid crystal display device 1 may display an image with high visibility by balancing the luminance distribution.

The liquid crystal display device 1 according to this embodiment includes the light control film 7 that is formed to satisfy the above equation (1), thus allocates the light in the region where the light flux amount is relatively large in the liquid crystal panel 4 to the region where the visibility of the displayed image is low due to relatively low luminance, and may thereby balance the luminance distribution. Accordingly, the liquid crystal display device 1 may display the displayed image with high visibility.

(Second Embodiment)

A liquid crystal display device according to a second embodiment will hereinafter be described.

The basic configuration of the liquid crystal display device of this embodiment is the same as the first embodiment, but the configuration of the light control film is different. Thus, in this embodiment, the basic configuration of the liquid crystal display device will not be described, and only the light control film will be described.

Figure 12:
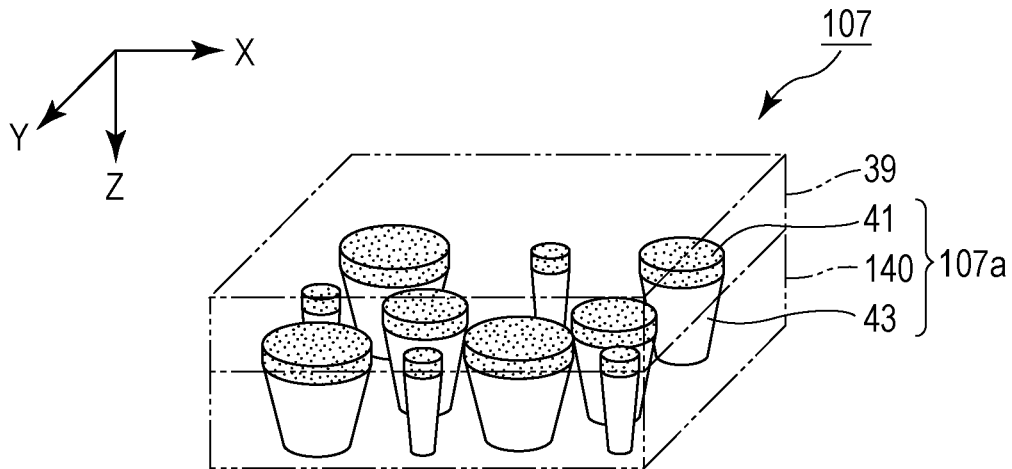
FIG. 12 is a diagram that illustrates a configuration of a light control film according to a second embodiment.
Figure 13:
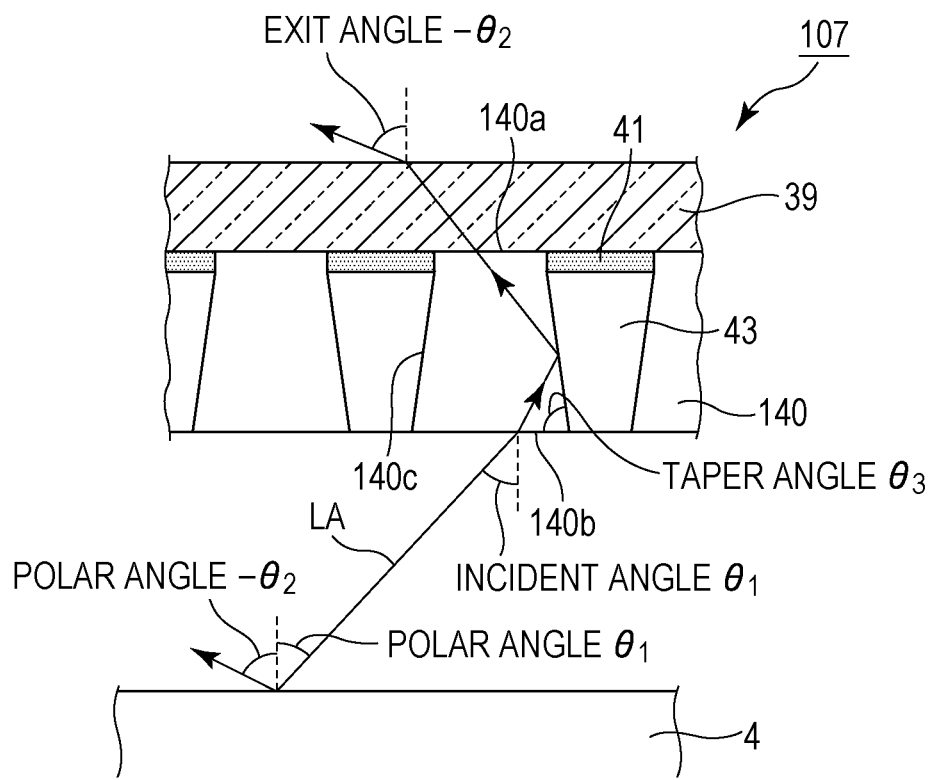
FIG. 13 is a diagram that illustrates a cross-sectional configuration of the light control film according to the same embodiment.

FIG. 12 is a diagram that illustrates a configuration of the light control film according to this embodiment, and FIG. 13 is a diagram that illustrates a cross-sectional configuration of the light control film according to this embodiment. Further, in the diagrams used in FIGS. 12 and 13, the same reference characters will be provided to the common elements to the drawings used in the first embodiment, and a detailed description thereof will not be made.

In the first embodiment, the plural light diffusion portions 40 formed on one surface of the base material 39 and the light shielding layer 41 formed on one surface of the base material 39 in the region other than the regions where the light diffusion portions 40 are formed are provided. The plural light diffusion portions 40 are arranged in a scattered manner as seen in the normal direction of one surface of the base material 39.

On the other hand, as illustrated in FIG. 12, a light control film 107 of this embodiment includes the base material 39 and a light control layer 107a that is formed on one surface of the base material 39 (the surface on the opposite side to the visually recognized side) and controls the emission direction of light by diffusing the light from the liquid crystal panel 4. The light control layer 107a includes plural light shielding layers 41 formed on one surface of the base material 39, a light diffusion portion 140 formed on one surface of the base material 39 in the region other than regions where the light shielding layers 41 are formed, and hollow portions 43 formed on one surface of the base material 39 in the regions where the light shielding layers 41 are formed.

The plural light shielding layers 41 are arranged in a scattered manner as seen in the normal direction of one surface of the base material 39. The light diffusion portion 140 is integrally formed in the region other than the regions where the light shielding layers 41 are formed. The plural light shielding layers 41 are arranged at random (aperiodically) as seen in the normal direction of the main surface of the base material 39. The plural hollow portions 43 formed in the positions that correspond to the plural light shielding layers 41 are arranged at random on the base material 39.

The intervals (pitches) of the light shielding layers 41 are preferably shorter than the intervals of the pixels of the liquid crystal panel 4. Accordingly, at least one light shielding layer 41 is formed in the pixel. Thus, a wide viewing angle may be expected when the light shielding layer 41 are combined with a liquid crystal panel with short pixel pitches that is used for a mobile apparatus or the like, for example.

The horizontal cross-sectional (xy cross-sectional) shape of the hollow portion 43 is circular. The area of the base material 39 side that serves as a light emission end surface is large, and the area of the surface on the opposite side to the base material 39 that serves as a light incident end surface is small. The area of the horizontal cross section becomes gradually smaller from the base material 39 side toward the opposite side to the base material 39. That is, the hollow portion 43 is in a so-called tapered and truncated cone shape as seen from the base material 39 side.

The internal portion of the hollow portion 43 is an air layer. The light diffusion portion 140 is configured with a portion other than the hollow portions 43. The light diffusion portion 140 is configured with an integrally provided transparent resin and is a portion that contributes to transmission of light. Accordingly, the light incident on the light diffusion portion 40 is totally reflected by an interface between the light diffusion portion 140 and the hollow portion 43, guided while being substantially trapped in an internal portion of the light diffusion portion 140, and then emitted to an external portion via the base material 39.

It is preferable that each of the refractive indices of the base material 39 and the light diffusion portion 140 is substantially equivalent. In a case where the refractive index is largely different between those, unnecessary refraction or reflection of light occurs at the interface between the light diffusion portion 140 and the base material 39 when the light incident from a light incident end surface 140b is incident from the light diffusion portion 140 on the base material 39. That is, this may result in problems such as difficulty in obtaining a desired light diffusion angle and a decrease in the amount of emitted light. However, occurrences of the problems may be avoided by setting the substantially equivalent refractive indices as described above.

As illustrated in FIG. 13, between two facing surfaces of the light diffusion portion 140, the surface with the smaller area (the surface that contacts with the base material 39) becomes a light emission end surface 140a, and the surface with the larger area (the surface on the opposite side to the base material 39) becomes the light incident end surface 140b.

The taper angle $\theta_3$ (the angle formed between the light incident end surface 140b and the side surface 140c) of a side surface 140c (the interface between the light diffusion portion 140 and the hollow portion 43) of the light diffusion portion 140 is configured to satisfy equation (1), similarly to the above embodiment.

In the case of this embodiment, air is interposed among the adjacent light diffusion portions 140. Thus, the side surface 140c of the light diffusion portion 140 is the interface between an acrylic resin and air in a case where the light diffusion portion 140 is formed of the acrylic resin, for example.

Thus, in accordance with Snell's law, the critical angle becomes smallest in the configuration of this embodiment, and the incident angle range where light is totally reflected by the side surface 140c of the light diffusion portion 140 becomes wide. As a result, loss of light may be further reduced, and high luminance may be obtained.

In this embodiment, in order to enable total reflection of light, a periphery of the light diffusion portion 140 may be in a low refraction state and in a state where the periphery is filled with inactive gas such as nitrogen instead of air. Alternatively, spaces among the light diffusion portions 140 may be in a vacuum state or a lower pressure state than the atmosphere.

In the liquid crystal display device 1 according to this embodiment as described above, the light control film 107 includes the light diffusion portion 140 that has the side surface 140c with the taper angle $\theta_3$ which satisfies the above prescribed conditions. Thus, the light in the region where the light flux amount is relatively large in the liquid crystal panel 4 is allocated to the region where the visibility of the displayed image is low due to relatively low luminance, and the luminance distribution may thereby be balanced. Accordingly, the liquid crystal display device 1 of this embodiment may display the displayed image with high visibility.

(Third Embodiment)

A liquid crystal display device according to a third embodiment will hereinafter be described.

The basic configuration of the liquid crystal display device of this embodiment is the same as the first embodiment, but the configuration of the light control film is different from the first embodiment. Thus, in this embodiment, the basic configuration of the liquid crystal display device will not be described, and the light control film will mainly be described. In a description made below, the same reference characters will be provided to the common elements to the drawings used in the first embodiment, and a detailed description thereof will not be made.

In the first embodiment, the planar shapes of the light diffusion portions 40 in the light control film 7 as seen in the Z axis direction are formed in dots that are vertically and horizontally symmetric like circles.

On the other hand, in this embodiment, the planar shapes of the light diffusion portions in the light control film as seen in the Z axis direction are formed in dots which are asymmetric between the vertical and horizontal directions, as represented by ellipses, for example.

Figure 14:
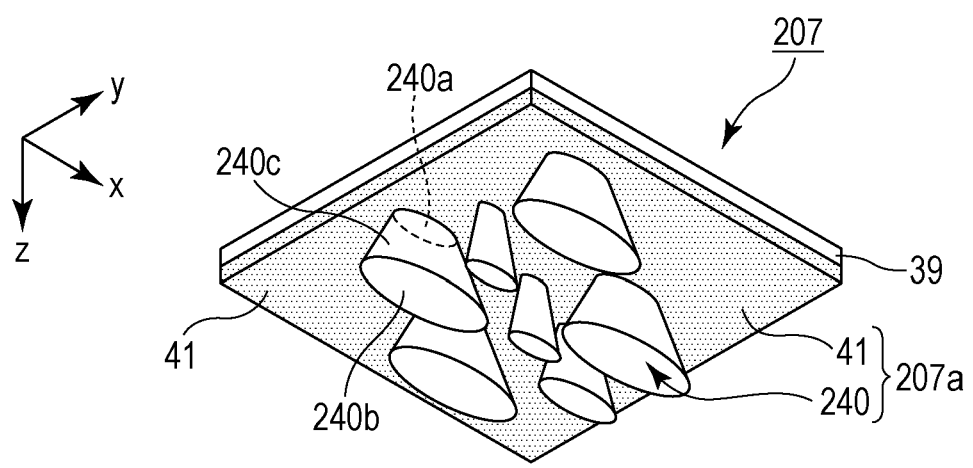
FIG. 14 is a perspective view of a light control film according to a third embodiment in the backlight direction.
Figure 15:
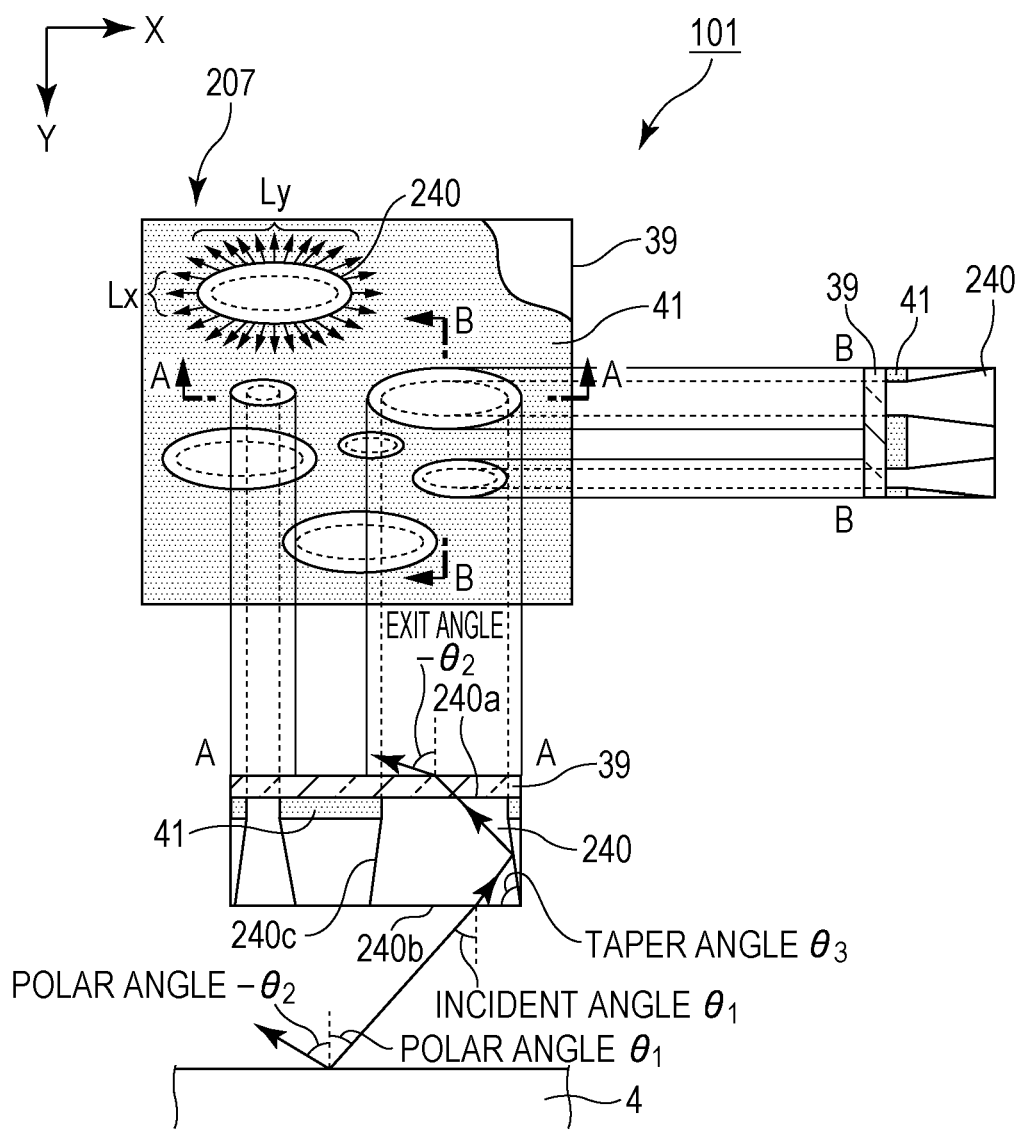
FIG. 15 is a schematic diagram of the light control film according to the third embodiment.

FIG. 14 is a perspective view of a light control film 207 in the backlight direction. FIG. 15 is a schematic diagram of the light control film 207. In FIG. 15, the upper left side is a plan view of the light control film 207 of this embodiment. The lower left side is a cross-sectional view taken along line A-A of the plan view on the upper left side. The upper right side is a cross-sectional view taken along line B-B of the plan view on the upper left side. In FIG. 15, for easy understanding of the drawing, the second polarizing plate 5 is not illustrated, and the liquid crystal panel 4 and the light control film 207 are illustrated in a separated state.

As illustrated in FIG. 14, the light control film 207 includes the base material 39 and a light control layer 207a that is formed on one surface of the base material 39 (the surface on the opposite side to the visually recognized side) and controls the emission direction of light by diffusing the light from the liquid crystal panel 4. The light control layer 207a is configured with plural light diffusion portions 240 and the light shielding layer 41 (light shielding portion) formed on one surface of the base material 39. Further, in this embodiment, the plural light diffusion portions 240 with different sizes are present in a scattered manner.

As illustrated in the upper left side of FIG. 15, the light control film 207 is provided with the plural light diffusion portions 240 on one surface of the base material 39 in a scattered manner. The planar shape of the light diffusion portion 240 as seen in the normal direction of the base material 39 is an elongated elliptic shape. The light diffusion portion 240 has the major axis and the minor axis. In the light control film 207 of this embodiment, the ratio of the length of the minor axis to the length of the major axis is approximately equivalent to each other in the light diffusion portions 240.

As illustrated in the lower left side and the upper right side of FIG. 15, the light diffusion portion 240 is formed in a truncated elliptic cone shape. The light shielding layer 41 is integrally provided on one surface of the base material 39 in a portion other than the plural light diffusion portions 240.

In the light control film 207 of this embodiment, the major axis direction of the ellipse that forms the planar shape of each of the light diffusion portions 240 (which may hereinafter be referred to as the major axis direction of the light diffusion portion) is approximately along the X direction. The minor axis direction of the ellipse that forms the planar shape of each of the light diffusion portions 240 (which may hereinafter be referred to as the minor axis direction of the light diffusion portion) is approximately along the Y direction. Accordingly, considering the orientation of a side surface 240c of the light diffusion portion 240, the ratio of the side surface 240c along the X direction is higher than the ratio of the side surface 240c along the Y direction in the side surface 240c of the light diffusion portion 240. Thus, light Ly that is reflected by the side surface 240c along the X direction and diffuses in the Y direction is more than light Lx that is reflected by the side surface 240c along the Y direction and diffuses in the X direction. Accordingly, the azimuth angle direction where the diffusibility of the light control film 207 is relatively high is the Y direction that is the minor axis direction of the light shielding layer 41.

That is, the light control film 207 according to this embodiment has the anisotropy that diffuses light in an anisotropic manner and has the azimuth angle direction with relatively high diffusibility (anisotropy) in the Y direction.

In this embodiment also, the taper angle $\theta_3$ (the angle formed between a light incident end surface 240b and the side surface 240c) of the side surface 240c (the interface between the light diffusion portion 240 and air) of the light diffusion portion 240 is configured to satisfy equation (1), similarly to the above embodiments.

Thus, in the liquid crystal display device of this embodiment, the light control film 207 is arranged on the liquid crystal panel 4 such that the azimuth angle direction with relatively high diffusibility (anisotropy) corresponds with a prescribed direction (viewing angle characteristic improvement direction (Y direction)) in the liquid crystal panel 4.

As described above, in a liquid crystal display device 101 according to this embodiment, the light control film 207 includes the light diffusion portion 240 that has the side surface 240c with the taper angle $\theta_3$ which satisfies the above prescribed conditions, as described above. Thus, the light in the region where the light flux amount is relatively large in the liquid crystal panel 4 is allocated to the region where the visibility of the displayed image is low due to relatively low luminance, and the luminance distribution may thereby be balanced. Accordingly, the liquid crystal display device 101 may display an image with high visibility.

Further, in the liquid crystal display device 101 of this embodiment, the light control film 207 is arranged in the liquid crystal panel 4 such that the azimuth angle direction with relatively high diffusibility (anisotropy) corresponds with a prescribed direction (viewing angle characteristic improvement direction (Y direction)) in the liquid crystal panel 4.

Accordingly, the liquid crystal display device 101 properly diffuses light in the viewing angle characteristic improvement direction in the liquid crystal panel 4 and may thereby display a bright image with high visibility.

(Fourth Embodiment)
A liquid crystal display device according to a fourth embodiment will hereinafter be described.

The basic configuration of the liquid crystal display device of this embodiment is the same as the third embodiment, but the configuration of the light control film is different from the first embodiment. Thus, in this embodiment, the basic configuration of the liquid crystal display device will not be described, and only the light control film will be described. The difference between this embodiment and the third embodiment is the same as the relationship between the first embodiment and the second embodiment. That is, in this embodiment, the plural light shielding layers 41 are arranged at random on one surface of the base material 39, and a light diffusion portion 340 is integrally formed on one surface of the base material 39 in the region other than regions where the light shielding layers 41 are formed.

Figure 16:
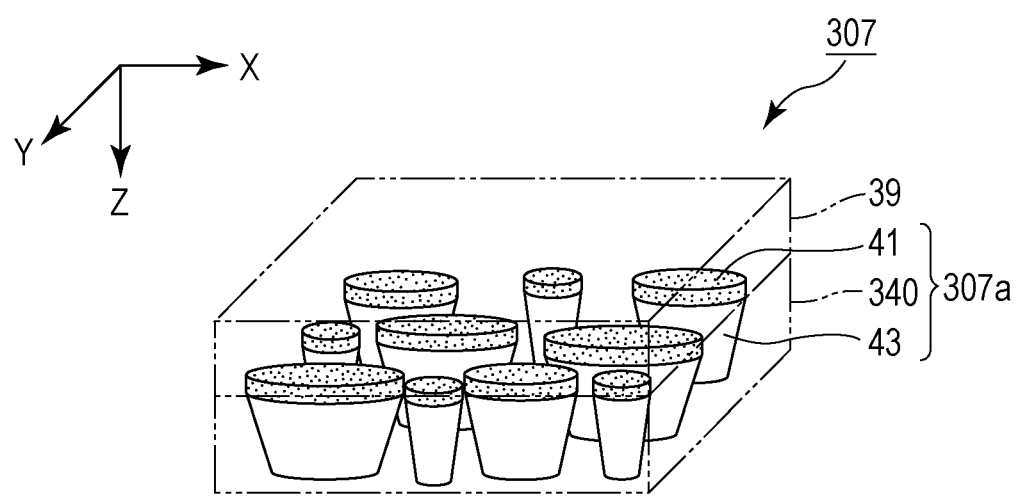
FIG. 16 is a perspective view of a light control film according to a fourth embodiment in the backlight direction.
Figure 17:
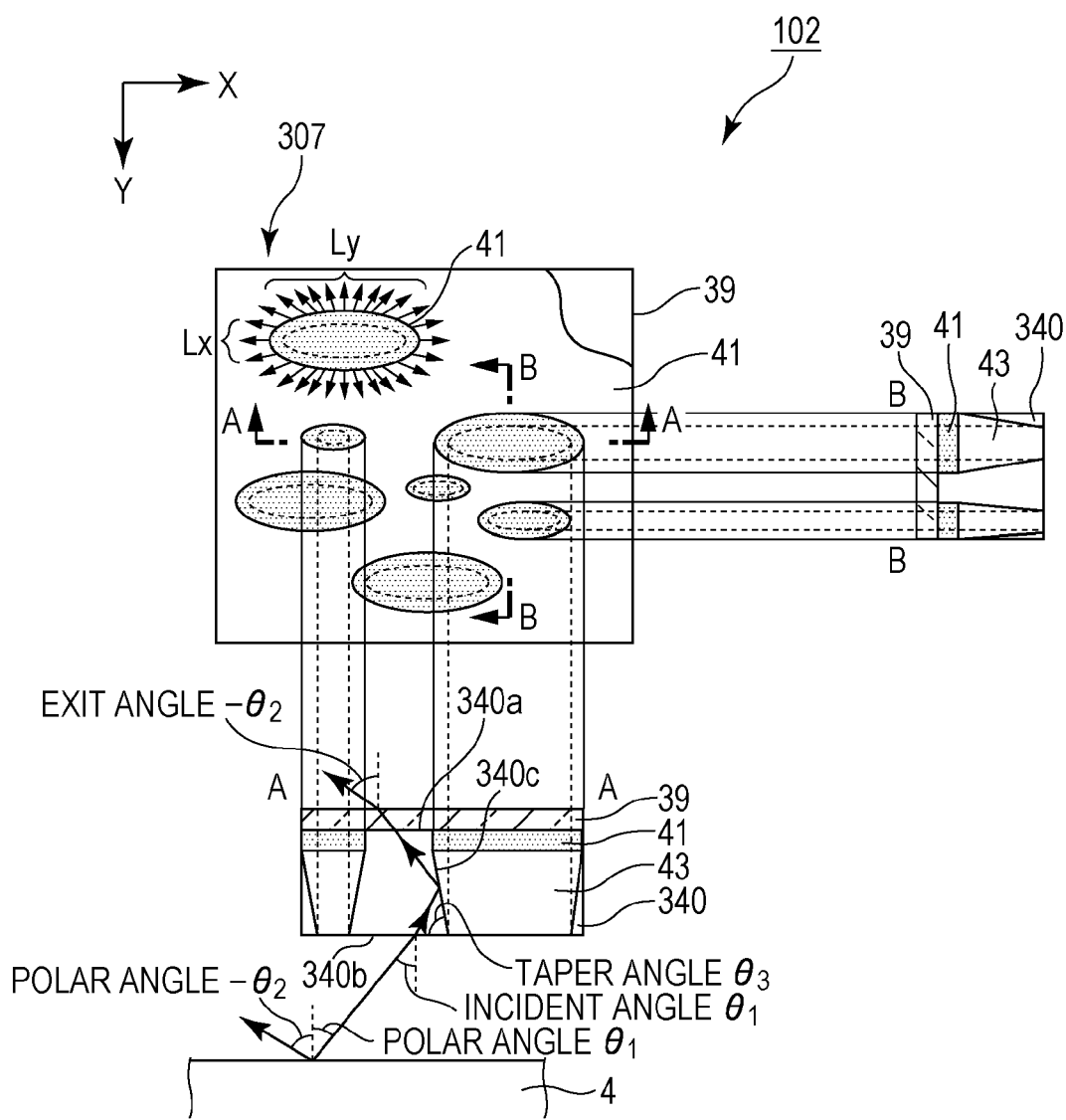
FIG. 17 is a schematic diagram of the light control film according to the same embodiment.

FIG. 16 is a perspective view of a light control film 307 according to this embodiment in the backlight direction. FIG. 17 is a schematic diagram of the light control film 307 according to this embodiment. In FIG. 17, the upper left side is a plan view of the light control film 307. The lower left side is a cross-sectional view taken along line A-A of the plan view on the upper left side. The upper right side is a cross-sectional view taken along line B-B of the plan view on the upper left side.

As illustrated in FIG. 16, the light control film 307 includes the base material 39 and a light control layer 307a that is formed on one surface of the base material 39 (the surface on the opposite side to the visually recognized side) and controls the emission direction of light by diffusing the light from the liquid crystal panel 4. The light control layer 307a includes the plural light shielding layers 41 (light shielding portions), the light diffusion portion 340, and the hollow portions 43.

As illustrated in the upper left side of FIG. 17, the light control film 307 is provided with the plural light shielding layers 41 on one surface of the base material 39 in a scattered manner. The planar shape of the light shielding layer 41 as seen in the normal direction of the base material 39 is an elongated elliptic shape. The light shielding layer 41 has the major axis and the minor axis. In the light control film 307 of this embodiment, the ratio of the length of the minor axis to the length of the major axis is approximately equivalent to each other in the light shielding layers 41.

As illustrated in the lower left side and the upper right side of FIG. 17, the portion that corresponds to a portion below the light shielding layer 41 is the hollow portion 43 in a truncated elliptic cone shape. The light control film 307 has plural hollow portions 43. The light diffusion portion 340 is integrally provided in a portion other than the plural hollow portion 43.

In the light control film 307 of this embodiment, the major axis direction of the ellipse that forms the planar shape of each of the light shielding layers 41 (which may hereinafter be referred to as the major axis direction of the light shielding layer) is approximately along the X direction. The minor axis direction of the ellipse that forms the planar shape of each of the light shielding layers 41 (which may hereinafter be referred to as the minor axis direction of the light shielding layer) is approximately along the Y direction. Accordingly, considering the orientation of a side surface 340c of the light diffusion portion 340, the ratio of the side surface 340c along the X direction is higher than the ratio of the side surface 340c along the Y direction in the side surface 340c of the light diffusion portion 340. Thus, light Ly that is reflected by the side surface 340c along the X direction and diffuses in the Y direction is more than light Lx that is reflected by the side surface 340c along the Y direction and diffuses in the X direction. Accordingly, the azimuth angle direction where the diffusibility of the light control film 307 is relatively high is the Y direction that is the minor axis direction of the light shielding layer 41.

That is, the light control film 307 according to this embodiment has the anisotropy that diffuses light in an anisotropic manner and has the azimuth angle direction with relatively high diffusibility (anisotropy) in the Y direction.

In this embodiment also, the taper angle θ₃ (the angle formed between a light incident end surface 340*b* and the side surface 340*c* (the interface between the light diffusion portion 340 and the hollow portion 43) of the light diffusion portion 340 is configured to satisfy equation (1), similarly to the above embodiments.

Thus, in the liquid crystal display device of this embodiment, the light control film 307 is arranged on the liquid crystal panel 4 such that the azimuth angle direction with relatively high diffusibility (anisotropy) corresponds with a prescribed direction (the viewing angle characteristic improvement direction (Y direction)) in the liquid crystal panel 4.

Thus, in this embodiment also, the azimuth angle direction with relatively high diffusibility (anisotropy) corresponds with the prescribed direction (the viewing angle characteristic improvement direction (Y direction)) in the liquid crystal panel 4.

As described above, in a liquid crystal display device 102 according to this embodiment also, the light control film 307 includes the light diffusion portion 340 that has the side surface 340*c* with the taper angle θ₃ which satisfies the above prescribed conditions, as described above. Thus, an image with high visibility may be displayed.

Further, in the liquid crystal display device 102, the light control film 307 is arranged on the liquid crystal panel 4 such that the azimuth angle direction with relatively high diffusibility (anisotropy) corresponds with the prescribed direction (the viewing angle characteristic improvement direction (Y direction)) in the liquid crystal panel 4. Thus, the liquid crystal display device 102 provides high brightness and visibility.

(Fifth Embodiment)

A liquid crystal display device according to a fifth embodiment will hereinafter be described.

The basic configuration of the liquid crystal display device of this embodiment is the same as the third embodiment, but the configuration of the light control film is different from the third embodiment. Thus, in this embodiment, the basic configuration of the liquid crystal display device will not be described, and the light control film will mainly be described. In a description made below, the same reference characters will be provided to the common elements to the drawings used in the third embodiment, and a detailed description thereof will not be made.

In the third embodiment, the light diffusion portion 240 is arranged such that the azimuth angle direction (the minor axis direction) with relatively high diffusibility (anisotropy) corresponds (becomes parallel) with the prescribed angle (the viewing angle characteristic improvement direction (Y direction)) in the liquid crystal panel 4.

Figure 18:
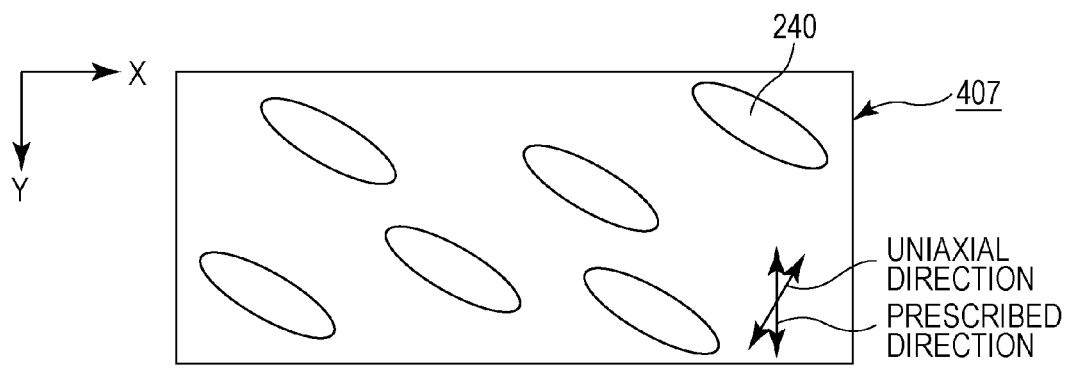
FIG. 18 is a schematic plan view of a light control film according to a fifth embodiment.

FIG. 18 is a schematic plan view of a light control film 407 of this embodiment.

As illustrated in FIG. 18, in the light control film 407 of this embodiment, the light diffusion portion 240 is arranged such that the azimuth angle direction with relatively high diffusibility (anisotropy) is not perfectly correspondent (parallel state) with the prescribed direction in the liquid crystal panel 4 but is in an approximately parallel state (slightly offset state). Here, being approximately parallel means a state where the angle formed between the minor axis direction of the light diffusion portion 240 and the prescribed direction of the liquid crystal panel 4 falls within ±30°.

The reason for setting a range of ±30° will be described below.

Figure 19:
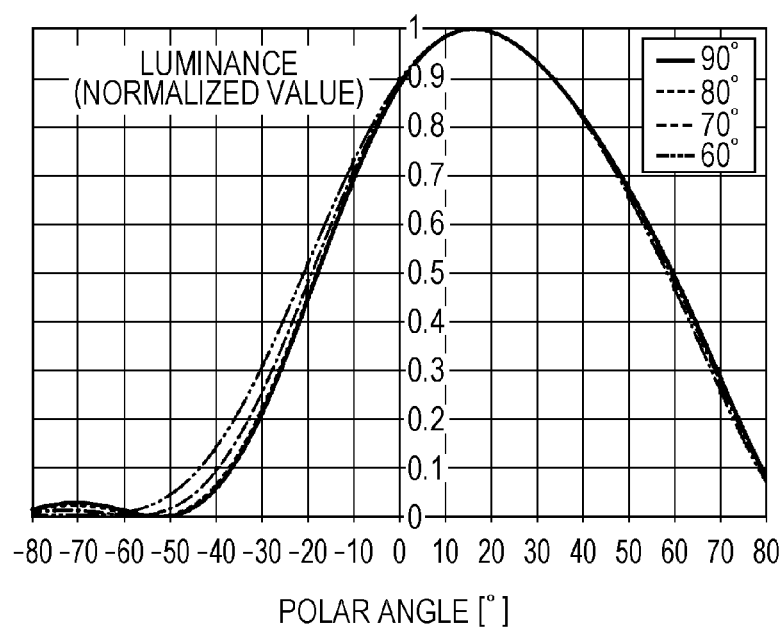
FIG. 19 is a graph that represents the change in the luminance value in a case where the azimuth angle direction is changed in the liquid crystal panel that performs display in a TN mode.
Figure 20:
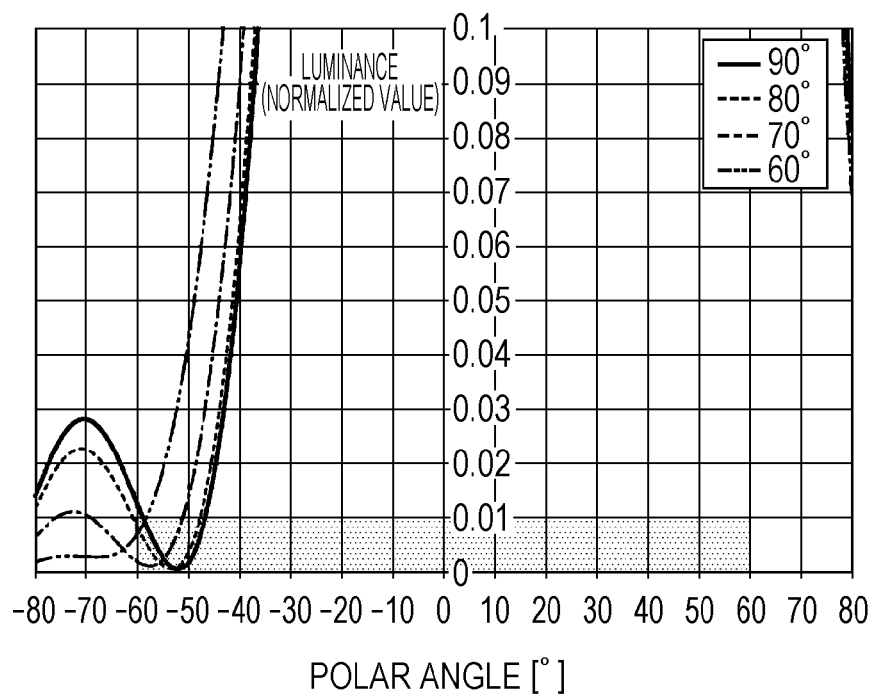
FIG. 20 is a graph illustrated in FIG. 19 with the scale of the vertical axis reduced.

FIG. 19 is a graph that represents the change in the luminance value in a case where the azimuth angle direction is changed in the liquid crystal panel 4 that performs display in the TN mode. FIG. 20 is a graph illustrated in FIG. 19 with the scale of the vertical axis reduced.

As illustrated in FIG. 19, the viewing angle characteristics of the liquid crystal panel 4 change in accordance with the azimuth angle direction.

As described in the definition of the above-described equation (1), the polar angle direction in which the user typically views the display is within ±60°, and the perceived quantity in which a person perceives brightness is proportional to logarithm in accordance with Weber-Fechner law. Thus, a person is hardly capable of perceiving the luminance if the luminance becomes ¹⁄₁₀₀.

Based on this finding, the inventors considered that when the light control film with the anisotropy was arranged on the liquid crystal panel, even in a case where the direction with relatively high anisotropy was slightly offset from the prescribed direction (the viewing angle improvement direction), a viewing angle improvement effect might sufficiently be obtained if the direction with high anisotropy falls within the angle range where the luminance value became ¹⁄₁₀₀ (0.01 in normalized value) or lower in the above-described polar angle range (within ±60°).

In the graph illustrated in FIG. 20, it may be observed that each of the directions offset by −10°, −20°, and −30° from the prescribed direction (azimuth angle of 90°) (that is, azimuth angles of 80°, 70°, and 60°) of the liquid crystal panel 4 that performs display in the TN mode has angles at which the normalized luminance becomes 1% or lower in the above-described polar angle range (within ±60°).

That is, it may be observed that the viewing angle improvement effect may be obtained when the direction with high anisotropy of the light control film falls within the angle range between the prescribed direction (azimuth angle of 90°) of the liquid crystal panel and −30° from that. FIG. 20 indicates the normalized luminance at azimuths offset by 10°, the maximum of −30°, in the negative direction from the prescribed direction (azimuth angle of) 90° of the liquid crystal panel. However, it may be considered that the normalized luminance at azimuths offset by 10°, the maximum of +30°, in the positive direction has the same tendency.

That is, it may be said that, in the characteristics of the liquid crystal panel 4 that performs display in the TN mode, the sufficient viewing angle improvement effect may be obtained when the light control film is arranged such that the direction with a high scattering intensity (anisotropy) of the light control film falls within the angle range of ±30° from the prescribed direction (azimuth angle of 90°) within the polar angle of ±60°.

Based on the above description, it is specified that being approximately parallel means the range where the crossing angle between the above directions is parallel (crossing angle of 0°) to ±30°.

As described above, in this embodiment, the light control film 407 is arranged on the liquid crystal panel 4 such that the azimuth angle direction with relatively high diffusibility (anisotropy) approximately corresponds with the prescribed direction in the liquid crystal panel 4 (falls within the range of ±30°). Thus, light is properly diffused in the viewing angle characteristic improvement direction, and a bright image with high visibility may thereby be displayed.

(Sixth Embodiment)

A liquid crystal display device according to a sixth embodiment will hereinafter be described.

The basic configuration of the liquid crystal display device of this embodiment is the same as the fifth embodiment, but the configuration of the light control film is different from the fifth embodiment. Thus, in this embodiment, the basic configuration of the liquid crystal display device will not be described, and only the light control film will be described.

Figure 21:
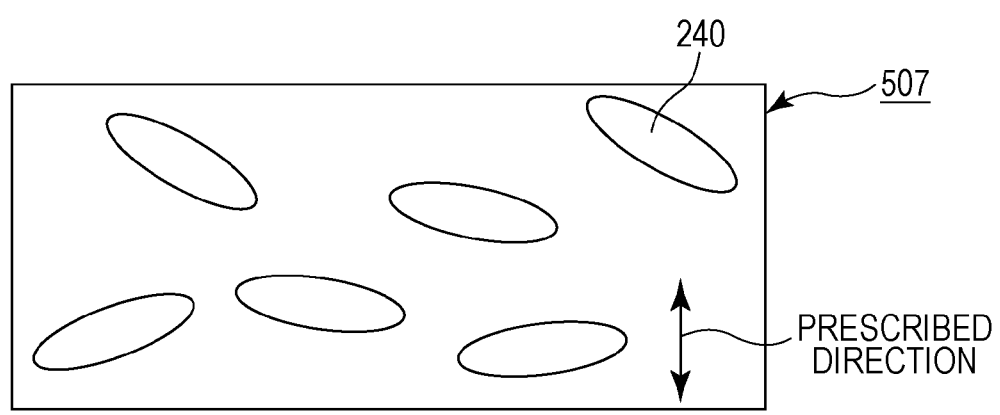
FIG. 21 is a schematic plan view of a light control film according to a sixth embodiment.

FIG. 21 is a schematic plan view of a light control film 507 of this embodiment.

As illustrated in FIG. 21, in the light control film 507 of this embodiment, each of the minor axis directions of the ellipses that form the planar shape of the light shielding layer 41 is directed in a different direction and is arranged.

In the light control film 507, the light diffusion portions 240 are arranged such that the respective azimuth angle directions with relatively high diffusibility (anisotropy) approximately (within ±30°) correspond with the prescribed direction in the liquid crystal panel 4.

As described above, in this embodiment also, the light control film 507 is arranged on the liquid crystal panel 4 such that the azimuth angle directions with relatively high diffusibility (anisotropy) approximately correspond with the prescribed direction in the liquid crystal panel 4. Thus, light is properly diffused in the viewing angle characteristic improvement direction, and a bright displayed image with high visibility may thereby be provided.

Further, in the above fifth and sixth embodiments, a description is made about examples where the light diffusion portions 240 are arranged such that the minor axes of all the light diffusion portions 240 become approximately (within ±30°) parallel with the prescribed direction of the liquid crystal panel 4. However, a portion of the plural light diffusion portions 240 may be off the range that is assumed to be approximately parallel.

That is, the present invention may provide the liquid crystal display device that may display an image with high visibility by properly diffusing light in the above-described viewing angle improvement direction as long as the minor axis direction of at least one of the plural light diffusion portions 240 corresponds with the range that is assumed to be approximately parallel with the prescribed direction of the liquid crystal panel 4.

Further, as the first and fourth embodiments, the fifth and sixth embodiments may also employ the configuration in which the plural light shielding layers 41 (hollow portions 43) are provided on one surface of the base material 39 in a scattered manner and the light diffusion portion is integrally provided, as the light control film.

INDUSTRIAL APPLICABILITY

The present invention is usable for various display devices such as liquid crystal display devices, organic electro-luminescence display devices, plasma displays, LED displays, and MEMS displays.

REFERENCE SIGNS LIST

1 liquid crystal display device
4 liquid crystal panel
7 light control film
7*a* light control layer
36 light source
39 base material
40 light diffusion portion
40*a* light emission end surface
40*b* light incident end surface
40*c* side surface (reflection surface)
41 light shielding layer
101 liquid crystal display device
102 liquid crystal display device
107 light control film
107*a* light control layer
140 light diffusion portion
140*a* light emission end surface
140*b* light incident end surface
140*c* side surface (reflection surface)
207 light control film
207*a* light control layer
240 light diffusion portion
240*b* light incident end surface
240*c* side surface (reflection surface)
307 light control film
307*a* light control layer
340 light diffusion portion
340*b* light incident end surface
340*c* side surface (reflection surface)
407, 507 light control film

The invention claimed is:

1. A light control film comprising:
a base material with transparency; and
a light control layer that is provided on a side of a surface which faces a display surface of a display panel in the base material, has a light shielding portion which is formed on one surface of the base material, and controls an emission direction of light by diffusing light which is emitted from the display surface,
wherein the light control layer includes a light emission end surface that contacts with the base material, a light incident end surface that faces the light emission end surface and has a larger area than an area of the light emission end surface, and a reflection surface that contacts with the light emission end surface and the light incident end surface and reflects light which is incident from the light incident end surface, a height from the light incident end surface to the light emission end surface is larger than a layer thickness of the light shielding portion, and
the reflection surface reflects light to allocate light at a polar angle with a relatively high light flux amount among directions along prescribed azimuth angles in the display surface to light at a polar angle with relatively low luminance among directions along prescribed azimuth angles.

2. The light control film according to claim 1,
wherein given that the polar angle with a largest light flux amount among the directions along the prescribed azimuth angles is set as $\theta_1$,
the polar angle at which normalized luminance of the display panel is 10% or lower in a range where the polar angle is −60° to 60° among the directions along the prescribed azimuth angles is set as $\theta_2$,
a refractive index of a film main body that includes the base material and the light control layer is set as n, and
an angle formed between the light incident end surface and the reflection surface is set as $\theta_3$,
the light control layer is configured to satisfy expression (1):

[Expression 1]

$$-\sin\theta_2 = n \times \sin\left\{\arcsin\left(\frac{\sin\theta_1}{n}\right) + 2(90° - \theta_3)\right\}. \qquad (1)$$

3. A display device comprising:
a display panel;
a base material with transparency; and
a light control layer that is provided on a side of a surface which faces a display surface of the display panel in the base material, has a light shielding portion which is formed on one surface of the base material, and controls an emission direction of light by diffusing light which is emitted from the display surface,
wherein the light control layer includes a light emission end surface that contacts with the base material, a light incident end surface that faces the light emission end surface and has a larger area than an area of the light emission end surface, and a reflection surface that contacts with the light emission end surface and the light incident end surface and reflects light which is incident from the light incident end surface, a height from the light incident end surface to the light emission end surface is larger than a layer thickness of the light shielding portion, and
the reflection surface reflects light to allocate light at a polar angle with a relatively high light flux amount among directions along prescribed azimuth angles in the display surface to light at a polar angle with relatively low luminance among directions along prescribed azimuth angles.

4. The display device according to claim 3,
wherein given that the polar angle with a largest light flux amount among the directions along the prescribed azimuth angles is set as $\theta_1$,
the polar angle at which normalized luminance of the display panel is 10% or lower in a range where the polar angle is −60° to 60° among the directions along the prescribed azimuth angles is set as $\theta_2$,
a refractive index of a film main body that includes the base material and the light control layer is set as n, and
an angle formed between the light incident end surface and the reflection surface is set as $\theta_3$,
the light control layer is configured to satisfy expression (2):

[Expression 2]

$$-\sin\theta_2 = n \times \sin\left\{\arcsin\left(\frac{\sin\theta_1}{n}\right) + 2(90° - \theta_3)\right\}. \quad (2)$$

5. The display device according to claim 3, wherein the light control layer has anisotropy that diffuses light which is emitted from the display panel in an anisotropic manner, and an azimuth angle direction in which the anisotropy is relatively high and the prescribed azimuth angle in the display surface are arranged to be approximately parallel.

6. The display device according to claim 3,
wherein in the display device, the light control layer includes the plural light shielding portions and a light diffusion portion that is formed on one surface of the base material in a region other than regions where the light shielding portions are formed, and
the light diffusion portion includes the light emission end surface, the light incident end surface, and the reflection surface.

7. The display device according to claim 6,
wherein planar shapes of the plural light shielding portions as seen in a normal direction of one surface of the base material are anisotropic shapes that have at least a major axis and a minor axis, and
a direction along the minor axis of at least a portion of the plural light shielding portions and the prescribed azimuth angle in the display surface are approximately parallel.

8. The display device according to claim 3, wherein the planar shape of the light shielding portion as seen in a normal direction of one surface of the base material is a circle or a polygon.

9. The display device according to claim 3, wherein the light shielding portions have at least one of plural kinds of sizes and shapes that are mutually different as seen in the normal direction of one surface of the base material.

10. The display device according to claim 6, wherein a hollow portion that is defined by the region where the light diffusion portion is formed is formed in the region where the light shielding portion is formed, and air is present in the hollow portion.

11. The display device according to claim 3, wherein the light control layer includes plural light diffusion portions that are formed on one surface of the base material and the light shielding portion that is formed on one surface of the base material in a region other than regions where the light diffusion portions are formed, and the light diffusion portion includes the light emission end surface, the light incident end surface, and the reflection surface.

12. The display device according to claim 11, wherein planar shapes of the plural light diffusion portions as seen in a normal direction of one surface of the base material are anisotropic shapes that have at least a major axis and a minor axis, and a direction along the minor axis of at least a portion of the plural light diffusion portions and the prescribed azimuth angle in the display surface are approximately parallel.

13. The display device according to claim 11, wherein the planar shape of the light diffusion portion as seen in the normal direction of one surface of the base material is a circle or a polygon.

14. The display device according to claim 11, wherein the plural light diffusion portions have at least one of plural kinds of sizes and shapes that are mutually different as seen in the normal direction of one surface of the base material.

15. The display device according to claim 11, wherein air is present in spaces among the plural light diffusion portions.

16. The display device according to claim 11, wherein the display panel has plural pixels that configure a displayed image, and a maximum pitch between the adjacent light diffusion portions among the plural light diffusion portions is shorter than a pitch between the pixels of the display panel.

17. The display device according to claim 3, wherein the display panel is a liquid crystal panel, and a display mode of the liquid crystal panel is a twisted nematic mode.

* * * * *